United States Patent
Kapczynski

(10) Patent No.: US 9,576,030 B1
(45) Date of Patent: Feb. 21, 2017

(54) KEEPING UP WITH THE JONESES

(71) Applicant: ConsumerInfo.com, Inc., Costa Mesa, CA (US)

(72) Inventor: Mark Joseph Kapczynski, Santa Monica, CA (US)

(73) Assignee: CONSUMERINFO.COM, INC., Costa Mesa, CA (US)

( * ) Notice: Subject to any disclaimer, the term of this patent is extended or adjusted under 35 U.S.C. 154(b) by 229 days.

(21) Appl. No.: 14/271,741

(22) Filed: May 7, 2014

(51) Int. Cl.
*G06F 17/30* (2006.01)

(52) U.S. Cl.
CPC ..... *G06F 17/3053* (2013.01); *G06F 17/30598* (2013.01)

(58) Field of Classification Search
USPC .................................................. 707/748, 758
See application file for complete search history.

(56) References Cited

U.S. PATENT DOCUMENTS

| | | |
|---|---|---|
| 3,316,395 A | 4/1967 | Lavin et al. |
| 4,774,664 A | 9/1988 | Campbell et al. |
| 4,775,935 A | 10/1988 | Yourick |
| 4,827,508 A | 5/1989 | Shear |
| 4,868,570 A | 9/1989 | Davis |
| 4,872,113 A | 10/1989 | Dinerstein |
| 4,935,870 A | 6/1990 | Burk, Jr. et al. |
| 5,056,019 A | 10/1991 | Schultz et al. |
| 5,247,575 A | 9/1993 | Sprague et al. |
| 5,274,547 A | 12/1993 | Zoffel et al. |
| 5,325,509 A | 6/1994 | Lautzenheiser |
| 5,341,429 A | 8/1994 | Stringer et al. |
| 5,454,030 A | 9/1995 | de Oliveira et al. |
| 5,504,675 A | 4/1996 | Cragun et al. |
| 5,528,701 A | 6/1996 | Aref |
| 5,555,409 A | 9/1996 | Leenstra, Sr. et al. |
| 5,563,783 A | 10/1996 | Stolfo et al. |
| 5,592,560 A | 1/1997 | Deaton et al. |
| 5,629,982 A | 5/1997 | Micali |
| 5,640,551 A | 6/1997 | Chu et al. |
| 5,655,129 A | 8/1997 | Ito |
| 5,659,731 A | 8/1997 | Gustafson |
| 5,666,528 A | 9/1997 | Thai |
| 5,696,907 A | 12/1997 | Tom |
| 5,737,732 A | 4/1998 | Gibson et al. |
| 5,739,512 A | 4/1998 | Tognazzini |
| 5,745,654 A | 4/1998 | Titan |
| 5,754,938 A | 5/1998 | Herz et al. |

(Continued)

FOREIGN PATENT DOCUMENTS

| | | |
|---|---|---|
| DE | 91 08 341 | 10/1991 |
| EP | 0 419 889 | 4/1991 |

(Continued)

OTHER PUBLICATIONS

U.S. Appl. No. 12/705,489, filed Feb. 12, 2010, Bargoli et al.

(Continued)

*Primary Examiner* — Hung T Vy
(74) *Attorney, Agent, or Firm* — Knobbe, Martens, Olson & Bear, LLP

(57) ABSTRACT

Consumers often desire to compare themselves to other individuals. Disclosed herein are systems and methods of generating and displaying comparison information to users so that they can determine if they are "keeping up with the Joneses."

20 Claims, 10 Drawing Sheets

(56) References Cited

U.S. PATENT DOCUMENTS

| | | | |
|---|---|---|---|
| 5,768,423 A | 6/1998 | Aref et al. |
| 5,774,692 A | 6/1998 | Boyer et al. |
| 5,774,868 A | 6/1998 | Cragun et al. |
| 5,778,405 A | 7/1998 | Ogawa |
| 5,797,136 A | 8/1998 | Boyer et al. |
| 5,812,840 A | 9/1998 | Shwartz |
| 5,819,226 A | 10/1998 | Gopinathan et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,835,915 A | 11/1998 | Carr et al. |
| 5,848,396 A | 12/1998 | Gerace |
| 5,870,721 A | 2/1999 | Norris |
| 5,881,131 A | 3/1999 | Farris et al. |
| 5,884,287 A | 3/1999 | Edesess |
| 5,905,985 A | 5/1999 | Malloy et al. |
| 5,912,839 A | 6/1999 | Ovshinsky et al. |
| 5,915,243 A | 6/1999 | Smolen |
| 5,926,800 A | 7/1999 | Baronowski et al. |
| 5,950,179 A | 9/1999 | Buchanan et al. |
| 5,956,693 A | 9/1999 | Geerlings |
| 5,963,932 A | 10/1999 | Jakobsson et al. |
| 5,974,396 A | 10/1999 | Anderson et al. |
| 5,978,780 A | 11/1999 | Watson |
| 6,009,415 A | 12/1999 | Shurling et al. |
| 6,014,688 A | 1/2000 | Venkatraman et al. |
| 6,018,723 A | 1/2000 | Siegel et al. |
| 6,026,368 A | 2/2000 | Brown et al. |
| 6,029,139 A | 2/2000 | Cunningham et al. |
| 6,044,357 A | 3/2000 | Garg |
| 6,064,990 A | 5/2000 | Goldsmith |
| 6,073,140 A | 6/2000 | Morgan et al. |
| 6,098,052 A | 8/2000 | Kosiba et al. |
| 6,119,103 A | 9/2000 | Basch et al. |
| 6,121,901 A | 9/2000 | Welch et al. |
| 6,128,602 A | 10/2000 | Northington et al. |
| 6,128,624 A | 10/2000 | Papierniak et al. |
| 6,144,957 A | 11/2000 | Cohen et al. |
| 6,151,601 A | 11/2000 | Papierniak et al. |
| 6,154,729 A | 11/2000 | Cannon et al. |
| 6,178,442 B1 | 1/2001 | Yamazaki |
| 6,182,060 B1 | 1/2001 | Hedgcock et al. |
| 6,202,053 B1 | 3/2001 | Christiansen et al. |
| 6,223,171 B1 | 4/2001 | Chaudhuri et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,304,860 B1 | 10/2001 | Martin et al. |
| 6,304,869 B1 | 10/2001 | Moore et al. |
| 6,330,546 B1 | 12/2001 | Gopinathan et al. |
| 6,334,110 B1 | 12/2001 | Walter et al. |
| 6,339,769 B1 | 1/2002 | Cochrane et al. |
| 6,366,903 B1 | 4/2002 | Agrawal et al. |
| 6,397,197 B1 | 5/2002 | Gindlesperger |
| 6,424,956 B1 | 7/2002 | Werbos |
| 6,430,539 B1 | 8/2002 | Lazarus et al. |
| 6,442,577 B1 | 8/2002 | Britton et al. |
| 6,456,979 B1 | 9/2002 | Flagg |
| 6,460,036 B1 | 10/2002 | Herz |
| 6,496,819 B1 | 12/2002 | Bello et al. |
| 6,505,176 B2 | 1/2003 | DeFrancesco, Jr. et al. |
| 6,513,018 B1 | 1/2003 | Culhane |
| 6,523,022 B1 | 2/2003 | Hobbs |
| 6,523,041 B1 | 2/2003 | Morgan et al. |
| 6,532,450 B1 | 3/2003 | Brown et al. |
| 6,543,683 B2 | 4/2003 | Hoffman |
| 6,574,623 B1 | 6/2003 | Laung et al. |
| 6,598,030 B1 | 7/2003 | Siegel et al. |
| 6,615,247 B1 | 9/2003 | Murphy |
| 6,622,266 B1 | 9/2003 | Goddard et al. |
| 6,623,529 B1 | 9/2003 | Lakritz |
| 6,631,496 B1 | 10/2003 | Li et al. |
| 6,651,220 B1 | 11/2003 | Penteroudakis et al. |
| 6,658,393 B1 | 12/2003 | Basch et al. |
| 6,665,715 B1 | 12/2003 | Houri |
| 6,748,426 B1 | 6/2004 | Shaffer et al. |
| 6,757,740 B1 | 6/2004 | Parekh et al. |
| 6,766,327 B2 | 7/2004 | Morgan, Jr. et al. |
| 6,801,909 B2 | 10/2004 | Delgado et al. |
| 6,804,701 B2 | 10/2004 | Muret et al. |
| 6,807,533 B2 | 10/2004 | Land et al. |
| 6,873,972 B1 | 3/2005 | Marcial et al. |
| 6,873,979 B2 | 3/2005 | Fishman et al. |
| 6,915,269 B1 | 7/2005 | Shapiro et al. |
| 6,925,441 B1 | 8/2005 | Jones, III et al. |
| 6,970,830 B1 | 11/2005 | Samra et al. |
| 6,983,379 B1 | 1/2006 | Spalink et al. |
| 6,983,478 B1 | 1/2006 | Grauch et al. |
| 6,985,882 B1 * | 1/2006 | Del Sesto ............... G06Q 30/02 705/27.1 |
| 6,999,941 B1 | 2/2006 | Agarwal |
| 7,003,504 B1 | 2/2006 | Angus et al. |
| 7,003,792 B1 | 2/2006 | Yuen |
| 7,028,052 B2 | 4/2006 | Chapman et al. |
| 7,031,945 B1 | 4/2006 | Donner |
| 7,039,607 B2 | 5/2006 | Watarai et al. |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,054,828 B2 | 5/2006 | Heching et al. |
| 7,069,240 B2 | 6/2006 | Spero et al. |
| 7,072,963 B2 | 7/2006 | Anderson et al. |
| 7,082,435 B1 | 7/2006 | Guzman et al. |
| 7,092,898 B1 | 8/2006 | Mattick et al. |
| 7,117,172 B1 | 10/2006 | Black |
| 7,136,448 B1 | 11/2006 | Venkataperumal et al. |
| 7,139,734 B2 | 11/2006 | Nathans et al. |
| 7,184,974 B2 | 2/2007 | Shishido |
| 7,185,016 B1 | 2/2007 | Rasmussen |
| 7,191,144 B2 | 3/2007 | White |
| 7,200,602 B2 | 4/2007 | Jonas |
| 7,206,768 B1 | 4/2007 | deGroeve et al. |
| 7,236,950 B2 | 6/2007 | Savage et al. |
| 7,240,059 B2 | 7/2007 | Bayliss et al. |
| 7,249,048 B1 | 7/2007 | O'Flaherty |
| 7,277,869 B2 | 10/2007 | Starkman |
| 7,277,900 B1 | 10/2007 | Ganesh et al. |
| 7,296,734 B2 | 11/2007 | Pliha |
| 7,308,418 B2 | 12/2007 | Malek et al. |
| 7,313,538 B2 | 12/2007 | Wilmes et al. |
| 7,314,166 B2 | 1/2008 | Anderson et al. |
| 7,360,251 B2 | 4/2008 | Spalink et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,376,603 B1 | 5/2008 | Mayr et al. |
| 7,376,714 B1 | 5/2008 | Gerken |
| 7,383,227 B2 | 6/2008 | Weinflash et al. |
| 7,386,786 B2 | 6/2008 | Davis et al. |
| 7,392,216 B1 | 6/2008 | Palmgren et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,421,322 B1 | 9/2008 | Silversmith et al. |
| 7,428,509 B2 | 9/2008 | Klebanoff |
| 7,458,508 B1 | 12/2008 | Shao et al. |
| 7,467,127 B1 | 12/2008 | Baccash et al. |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,556,192 B2 | 7/2009 | Wokaty, Jr. |
| 7,562,184 B2 | 7/2009 | Henmi et al. |
| 7,584,126 B1 | 9/2009 | White |
| 7,596,512 B1 | 9/2009 | Raines et al. |
| 7,596,716 B2 | 9/2009 | Frost et al. |
| 7,606,778 B2 | 10/2009 | Dewar |
| 7,610,243 B2 | 10/2009 | Haggerty et al. |
| 7,653,593 B2 | 1/2010 | Zarikian et al. |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,676,410 B2 | 3/2010 | Petralia |
| 7,686,214 B1 | 3/2010 | Shao et al. |

(56) References Cited

U.S. PATENT DOCUMENTS

| | | |
|---|---|---|
| 7,689,494 B2 | 3/2010 | Torre et al. |
| 7,693,787 B2 | 4/2010 | Provinse |
| 7,698,163 B2 | 4/2010 | Reed et al. |
| 7,707,059 B2 | 4/2010 | Reed et al. |
| 7,707,102 B2 | 4/2010 | Rothstein |
| 7,711,635 B2 | 5/2010 | Steele et al. |
| 7,711,636 B2 | 5/2010 | Robida et al. |
| 7,725,300 B2 | 5/2010 | Pinto et al. |
| 7,734,523 B1 | 6/2010 | Cui et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,761,379 B2 | 7/2010 | Zoldi et al. |
| 7,783,515 B1 | 8/2010 | Kumar et al. |
| 7,783,562 B1 | 8/2010 | Ellis |
| 7,793,835 B1 | 9/2010 | Coggeshall et al. |
| 7,797,252 B2 | 9/2010 | Rosskamm et al. |
| 7,805,345 B2 | 9/2010 | Abrahams et al. |
| 7,848,972 B1 | 12/2010 | Sharma |
| 7,848,978 B2 | 12/2010 | Imrey et al. |
| 7,848,987 B2 | 12/2010 | Haig |
| 7,849,004 B2 | 12/2010 | Choudhuri et al. |
| 7,853,518 B2 | 12/2010 | Cagan |
| 7,853,998 B2 | 12/2010 | Blaisdell et al. |
| 7,856,386 B2 | 12/2010 | Hazlehurst et al. |
| 7,856,397 B2 | 12/2010 | Whipple et al. |
| 7,860,786 B2 | 12/2010 | Blackburn et al. |
| 7,877,322 B2 | 1/2011 | Nathans et al. |
| 7,899,750 B1 | 3/2011 | Klieman et al. |
| 7,904,366 B2 | 3/2011 | Pogust |
| 7,912,865 B2 | 3/2011 | Akerman et al. |
| 7,930,242 B2 | 4/2011 | Morris et al. |
| 7,954,698 B1 | 6/2011 | Pliha |
| 7,974,860 B1 | 7/2011 | Travis |
| 7,983,976 B2 | 7/2011 | Nafeh et al. |
| 7,991,666 B2 | 8/2011 | Haggerty et al. |
| 7,991,688 B2 | 8/2011 | Phelan et al. |
| 7,991,689 B1 | 8/2011 | Brunzell et al. |
| 7,996,521 B2 | 8/2011 | Chamberlain et al. |
| 8,001,042 B1 | 8/2011 | Brunzell et al. |
| 8,005,712 B1 | 8/2011 | von Davier et al. |
| 8,005,759 B2 | 8/2011 | Hirtenstein et al. |
| 8,006,261 B1 | 8/2011 | Haberman et al. |
| 8,024,263 B2 | 9/2011 | Zarikian et al. |
| 8,024,264 B2 | 9/2011 | Chaudhuri et al. |
| 8,036,979 B1 | 10/2011 | Torrez et al. |
| 8,065,233 B2 | 11/2011 | Lee et al. |
| 8,065,234 B2 | 11/2011 | Liao et al. |
| 8,078,453 B2 | 12/2011 | Shaw |
| 8,078,528 B1 | 12/2011 | Vicente et al. |
| 8,082,202 B2 | 12/2011 | Weiss |
| 8,086,524 B1 | 12/2011 | Craig et al. |
| 8,095,443 B2 | 1/2012 | DeBie |
| 8,099,356 B2 | 1/2012 | Feinstein et al. |
| 8,104,671 B2 | 1/2012 | Besecker et al. |
| 8,104,679 B2 | 1/2012 | Brown |
| 8,126,805 B2 | 2/2012 | Sulkowski et al. |
| 8,135,642 B1 | 3/2012 | Krause |
| 8,145,754 B2 | 3/2012 | Chamberlain et al. |
| 8,161,104 B2 | 4/2012 | Tomkow |
| 8,204,774 B2 | 6/2012 | Chwast et al. |
| 8,214,238 B1 | 7/2012 | Fairfield et al. |
| 8,219,464 B2 | 7/2012 | Inghelbrecht et al. |
| 8,234,498 B2 | 7/2012 | Britti et al. |
| 8,271,378 B2 | 9/2012 | Chaudhuri et al. |
| 8,280,805 B1 | 10/2012 | Abrahams et al. |
| 8,290,840 B2 | 10/2012 | Kasower |
| 8,296,213 B2 | 10/2012 | Haggerty et al. |
| 8,296,229 B1 | 10/2012 | Yellin et al. |
| 8,301,574 B2 | 10/2012 | Kilger et al. |
| 8,315,943 B2 | 11/2012 | Torrez et al. |
| 8,326,672 B2 | 12/2012 | Haggerty et al. |
| 8,364,518 B1 | 1/2013 | Blake et al. |
| 8,364,588 B2 | 1/2013 | Celka et al. |
| 8,386,377 B1 | 2/2013 | Xiong et al. |
| 8,392,334 B2 | 3/2013 | Hirtenstein et al. |
| 8,401,889 B2 | 3/2013 | Chwast et al. |
| 8,468,198 B2 | 6/2013 | Tomkow |
| 8,515,828 B1 | 8/2013 | Wolf et al. |
| 8,515,862 B2 | 8/2013 | Zhang et al. |
| 8,533,322 B2 | 9/2013 | Chamberlain et al. |
| 8,560,434 B2 | 10/2013 | Morris et al. |
| 8,566,167 B2 | 10/2013 | Munjal |
| 8,626,560 B1 | 1/2014 | Anderson |
| 8,626,646 B2 | 1/2014 | Torrez et al. |
| 8,630,929 B2 | 1/2014 | Haggerty et al. |
| 8,639,920 B2 | 1/2014 | Stack et al. |
| 8,732,004 B1 | 5/2014 | Ramos et al. |
| 8,738,515 B2 | 5/2014 | Chaudhuri et al. |
| 8,930,251 B2 | 1/2015 | DeBie |
| 8,966,649 B2 | 2/2015 | Stack et al. |
| 9,026,088 B1 * | 5/2015 | Groenjes ............... H04W 4/021 455/41.1 |
| 9,147,042 B1 | 9/2015 | Haller et al. |
| 9,152,727 B1 | 10/2015 | Balducci et al. |
| 9,251,541 B2 | 2/2016 | Celka et al. |
| 2001/0014868 A1 | 8/2001 | Herz et al. |
| 2001/0029470 A1 | 10/2001 | Schultz et al. |
| 2001/0037332 A1 | 11/2001 | Miller et al. |
| 2001/0039523 A1 | 11/2001 | Iwamoto |
| 2001/0049620 A1 | 12/2001 | Blasko |
| 2002/0026411 A1 | 2/2002 | Nathans et al. |
| 2002/0029162 A1 | 3/2002 | Mascarenhas |
| 2002/0052841 A1 | 5/2002 | Guthrie et al. |
| 2002/0055869 A1 | 5/2002 | Hegg |
| 2002/0077964 A1 | 6/2002 | Brody et al. |
| 2002/0091706 A1 | 7/2002 | Anderson et al. |
| 2002/0099628 A1 | 7/2002 | Yakaoka et al. |
| 2002/0099824 A1 | 7/2002 | Bender et al. |
| 2002/0099936 A1 | 7/2002 | Kou et al. |
| 2002/0119824 A1 | 8/2002 | Allen |
| 2002/0120504 A1 | 8/2002 | Gould et al. |
| 2002/0123928 A1 | 9/2002 | Eldering et al. |
| 2002/0129368 A1 | 9/2002 | Schlack et al. |
| 2002/0138297 A1 | 9/2002 | Lee |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0138417 A1 | 9/2002 | Lawrence |
| 2002/0147695 A1 | 10/2002 | Khedkar et al. |
| 2002/0156676 A1 | 10/2002 | Ahrens et al. |
| 2002/0161496 A1 | 10/2002 | Yamaki |
| 2002/0161664 A1 | 10/2002 | Shaya et al. |
| 2002/0173984 A1 | 11/2002 | Robertson et al. |
| 2002/0173994 A1 | 11/2002 | Ferguson, III |
| 2002/0184255 A1 | 12/2002 | Edd et al. |
| 2002/0194103 A1 | 12/2002 | Nabe |
| 2003/0018549 A1 | 1/2003 | Fei et al. |
| 2003/0018578 A1 | 1/2003 | Schultz |
| 2003/0018769 A1 | 1/2003 | Foulger et al. |
| 2003/0023489 A1 | 1/2003 | McGuire et al. |
| 2003/0041031 A1 | 2/2003 | Hedy |
| 2003/0060284 A1 | 3/2003 | Hamalainen et al. |
| 2003/0069839 A1 | 4/2003 | Whittington et al. |
| 2003/0078877 A1 | 4/2003 | Beirne et al. |
| 2003/0093289 A1 | 5/2003 | Thornley et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0105728 A1 | 6/2003 | Yano et al. |
| 2003/0110111 A1 | 6/2003 | Nalebuff et al. |
| 2003/0110293 A1 | 6/2003 | Friedman et al. |
| 2003/0120591 A1 | 6/2003 | Birkhead et al. |
| 2003/0158776 A1 | 8/2003 | Landesmann |
| 2003/0171942 A1 | 9/2003 | Gaito |
| 2003/0200151 A1 | 10/2003 | Ellenson et al. |
| 2003/0208362 A1 | 11/2003 | Enthoven et al. |
| 2003/0212654 A1 | 11/2003 | Harper et al. |
| 2003/0219709 A1 | 11/2003 | Olenick et al. |
| 2003/0225742 A1 | 12/2003 | Tenner et al. |
| 2003/0229892 A1 | 12/2003 | Sardera |
| 2003/0233278 A1 | 12/2003 | Marshall |
| 2004/0006536 A1 | 1/2004 | Kawashima et al. |

(56) References Cited

U.S. PATENT DOCUMENTS

| | | |
|---|---|---|
| 2004/0010443 A1 | 1/2004 | May et al. |
| 2004/0030649 A1 | 2/2004 | Nelson et al. |
| 2004/0030667 A1 | 2/2004 | Xu et al. |
| 2004/0039688 A1 | 2/2004 | Sulkowski et al. |
| 2004/0059626 A1 | 3/2004 | Smallwood |
| 2004/0062213 A1 | 4/2004 | Koss |
| 2004/0078324 A1 | 4/2004 | Lonnberg et al. |
| 2004/0083215 A1 | 4/2004 | de Jong |
| 2004/0098625 A1 | 5/2004 | Lagadec et al. |
| 2004/0102197 A1 | 5/2004 | Dietz |
| 2004/0111305 A1 | 6/2004 | Gavan et al. |
| 2004/0117235 A1 | 6/2004 | Shacham |
| 2004/0117358 A1 | 6/2004 | Von Kaenel et al. |
| 2004/0122730 A1 | 6/2004 | Tucciarone et al. |
| 2004/0122735 A1 | 6/2004 | Meshkin |
| 2004/0128150 A1 | 7/2004 | Lundegren |
| 2004/0128230 A1 | 7/2004 | Oppenheimer et al. |
| 2004/0128236 A1 | 7/2004 | Brown et al. |
| 2004/0143546 A1 | 7/2004 | Wood et al. |
| 2004/0153448 A1 | 8/2004 | Cheng et al. |
| 2004/0158520 A1 | 8/2004 | Noh |
| 2004/0158523 A1 | 8/2004 | Dort |
| 2004/0176995 A1 | 9/2004 | Fusz |
| 2004/0186807 A1 | 9/2004 | Nathans et al. |
| 2004/0193538 A1 | 9/2004 | Raines |
| 2004/0199458 A1 | 10/2004 | Ho |
| 2004/0199462 A1 | 10/2004 | Starrs |
| 2004/0199789 A1 | 10/2004 | Shaw et al. |
| 2004/0205157 A1 | 10/2004 | Bibelnieks et al. |
| 2004/0220896 A1 | 11/2004 | Finlay et al. |
| 2004/0225545 A1 | 11/2004 | Turner et al. |
| 2004/0225596 A1 | 11/2004 | Kemper et al. |
| 2004/0230534 A1 | 11/2004 | McGough |
| 2004/0230820 A1 | 11/2004 | Hui Hsu et al. |
| 2004/0243588 A1 | 12/2004 | Tanner et al. |
| 2004/0261116 A1 | 12/2004 | Mckeown et al. |
| 2005/0004805 A1 | 1/2005 | Srinivasan |
| 2005/0021397 A1 | 1/2005 | Cui et al. |
| 2005/0027633 A1 | 2/2005 | Fortuna et al. |
| 2005/0038726 A1 | 2/2005 | Salomon et al. |
| 2005/0050027 A1 | 3/2005 | Yeh et al. |
| 2005/0102206 A1 | 5/2005 | Savasoglu et al. |
| 2005/0113991 A1 | 5/2005 | Rogers et al. |
| 2005/0137963 A1 | 6/2005 | Ricketts et al. |
| 2005/0144452 A1 | 6/2005 | Lynch et al. |
| 2005/0144641 A1 | 6/2005 | Lewis |
| 2005/0154664 A1 | 7/2005 | Guy et al. |
| 2005/0192008 A1 | 9/2005 | Desai et al. |
| 2005/0197953 A1 | 9/2005 | Broadbent et al. |
| 2005/0197954 A1 | 9/2005 | Maitland et al. |
| 2005/0201272 A1 | 9/2005 | Wang et al. |
| 2005/0209892 A1 | 9/2005 | Miller |
| 2005/0209922 A1 | 9/2005 | Hofmeister |
| 2005/0222900 A1 | 10/2005 | Fuloria et al. |
| 2005/0246256 A1 | 11/2005 | Gastineau et al. |
| 2005/0251408 A1* | 11/2005 | Swaminathan ........ G06Q 30/02 705/346 |
| 2005/0251474 A1 | 11/2005 | Shinn et al. |
| 2005/0256780 A1 | 11/2005 | Eldred |
| 2005/0257250 A1 | 11/2005 | Mitchell et al. |
| 2005/0267774 A1 | 12/2005 | Merritt et al. |
| 2005/0273849 A1 | 12/2005 | Araujo et al. |
| 2005/0278246 A1 | 12/2005 | Friedman et al. |
| 2005/0279827 A1 | 12/2005 | Mascavage et al. |
| 2005/0288954 A1 | 12/2005 | McCarthy et al. |
| 2006/0004626 A1 | 1/2006 | Holmen et al. |
| 2006/0014129 A1 | 1/2006 | Coleman et al. |
| 2006/0015425 A1 | 1/2006 | Brooks |
| 2006/0020611 A1 | 1/2006 | Gilbert et al. |
| 2006/0041443 A1 | 2/2006 | Horvath |
| 2006/0059073 A1 | 3/2006 | Walzak |
| 2006/0080251 A1 | 4/2006 | Fried et al. |
| 2006/0085334 A1 | 4/2006 | Murphy |
| 2006/0089842 A1 | 4/2006 | Medawar |
| 2006/0122921 A1 | 6/2006 | Comerford et al. |
| 2006/0129428 A1 | 6/2006 | Wennberg |
| 2006/0177226 A1 | 8/2006 | Ellis, III |
| 2006/0184440 A1 | 8/2006 | Britti et al. |
| 2006/0202012 A1 | 9/2006 | Grano et al. |
| 2006/0212350 A1 | 9/2006 | Ellis et al. |
| 2006/0229961 A1 | 10/2006 | Lyftogt et al. |
| 2006/0242046 A1 | 10/2006 | Haggerty et al. |
| 2006/0242048 A1 | 10/2006 | Haggerty et al. |
| 2006/0271457 A1 | 11/2006 | Romain et al. |
| 2006/0276171 A1 | 12/2006 | Pousti |
| 2006/0277102 A1 | 12/2006 | Agliozzo |
| 2006/0282328 A1 | 12/2006 | Gerace et al. |
| 2006/0293921 A1 | 12/2006 | McCarthy et al. |
| 2006/0294199 A1 | 12/2006 | Bertholf |
| 2007/0011039 A1 | 1/2007 | Oddo |
| 2007/0016500 A1 | 1/2007 | Chatterji et al. |
| 2007/0022297 A1 | 1/2007 | Britti et al. |
| 2007/0038497 A1 | 2/2007 | Britti et al. |
| 2007/0043654 A1 | 2/2007 | Libman |
| 2007/0055618 A1 | 3/2007 | Pogust |
| 2007/0055621 A1 | 3/2007 | Tischler et al. |
| 2007/0061195 A1 | 3/2007 | Liu et al. |
| 2007/0061243 A1 | 3/2007 | Ramer et al. |
| 2007/0067207 A1 | 3/2007 | Haggerty et al. |
| 2007/0067235 A1 | 3/2007 | Nathans et al. |
| 2007/0067297 A1 | 3/2007 | Kublickis |
| 2007/0083460 A1 | 4/2007 | Bachenheimer |
| 2007/0094137 A1 | 4/2007 | Phillips et al. |
| 2007/0106582 A1 | 5/2007 | Baker et al. |
| 2007/0112668 A1 | 5/2007 | Celano et al. |
| 2007/0121843 A1 | 5/2007 | Atazky et al. |
| 2007/0124235 A1 | 5/2007 | Chakraborty et al. |
| 2007/0156515 A1 | 7/2007 | Hasselback et al. |
| 2007/0156589 A1 | 7/2007 | Zimler et al. |
| 2007/0168246 A1 | 7/2007 | Haggerty et al. |
| 2007/0179860 A1 | 8/2007 | Romero |
| 2007/0208729 A1 | 9/2007 | Martino |
| 2007/0220611 A1 | 9/2007 | Socolow et al. |
| 2007/0226093 A1 | 9/2007 | Chan et al. |
| 2007/0250327 A1 | 10/2007 | Hedy |
| 2007/0282684 A1 | 12/2007 | Prosser et al. |
| 2007/0282736 A1 | 12/2007 | Conlin et al. |
| 2007/0288360 A1 | 12/2007 | Seeklus |
| 2008/0004957 A1 | 1/2008 | Hildreth et al. |
| 2008/0005313 A1 | 1/2008 | Flake et al. |
| 2008/0027859 A1 | 1/2008 | Nathans et al. |
| 2008/0028067 A1 | 1/2008 | Berkhin et al. |
| 2008/0052182 A1 | 2/2008 | Marshall |
| 2008/0059224 A1 | 3/2008 | Schechter |
| 2008/0059364 A1 | 3/2008 | Tidwell et al. |
| 2008/0065774 A1 | 3/2008 | Keeler |
| 2008/0086368 A1 | 4/2008 | Bauman et al. |
| 2008/0097768 A1 | 4/2008 | Godshalk |
| 2008/0103972 A1 | 5/2008 | Lanc |
| 2008/0110973 A1 | 5/2008 | Nathans et al. |
| 2008/0120155 A1 | 5/2008 | Pliha |
| 2008/0133273 A1 | 6/2008 | Marshall |
| 2008/0133325 A1 | 6/2008 | De et al. |
| 2008/0134042 A1 | 6/2008 | Jankovich |
| 2008/0140476 A1 | 6/2008 | Anand et al. |
| 2008/0140576 A1 | 6/2008 | Lewis et al. |
| 2008/0154766 A1 | 6/2008 | Lewis et al. |
| 2008/0167956 A1 | 7/2008 | Keithley |
| 2008/0172324 A1 | 7/2008 | Johnson |
| 2008/0177655 A1 | 7/2008 | Zalik |
| 2008/0177836 A1 | 7/2008 | Bennett |
| 2008/0183564 A1 | 7/2008 | Tien et al. |
| 2008/0208548 A1 | 8/2008 | Metzger et al. |
| 2008/0208610 A1 | 8/2008 | Thomas et al. |
| 2008/0215470 A1 | 9/2008 | Sengupta et al. |
| 2008/0221970 A1 | 9/2008 | Megdal et al. |
| 2008/0221990 A1 | 9/2008 | Megdal et al. |
| 2008/0228556 A1 | 9/2008 | Megdal et al. |
| 2008/0228635 A1 | 9/2008 | Megdal et al. |
| 2008/0243680 A1 | 10/2008 | Megdal et al. |
| 2008/0262925 A1* | 10/2008 | Kim ................ G06Q 30/02 705/14.27 |
| 2008/0263638 A1 | 10/2008 | McMurtry et al. |
| 2008/0294540 A1 | 11/2008 | Celka et al. |

(56) References Cited

U.S. PATENT DOCUMENTS

| | | |
|---|---|---|
| 2008/0301016 A1 | 12/2008 | Durvasula et al. |
| 2008/0301188 A1 | 12/2008 | O'Hara |
| 2008/0312963 A1* | 12/2008 | Reiner .................. G06F 19/327 705/2 |
| 2008/0312969 A1 | 12/2008 | Raines et al. |
| 2009/0006185 A1 | 1/2009 | Stinson |
| 2009/0006475 A1 | 1/2009 | Udezue et al. |
| 2009/0012889 A1 | 1/2009 | Finch |
| 2009/0018996 A1 | 1/2009 | Hunt et al. |
| 2009/0024505 A1 | 1/2009 | Patel et al. |
| 2009/0030776 A1 | 1/2009 | Walker et al. |
| 2009/0043637 A1 | 2/2009 | Eder |
| 2009/0048877 A1 | 2/2009 | Binns et al. |
| 2009/0076883 A1 | 3/2009 | Kilger et al. |
| 2009/0089190 A1 | 4/2009 | Girulat |
| 2009/0089205 A1 | 4/2009 | Bayne |
| 2009/0094675 A1 | 4/2009 | Powers |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0132347 A1 | 5/2009 | Anderson et al. |
| 2009/0144102 A1 | 6/2009 | Lopez |
| 2009/0144201 A1 | 6/2009 | Gierkink et al. |
| 2009/0172815 A1 | 7/2009 | Gu et al. |
| 2009/0198557 A1 | 8/2009 | Wang et al. |
| 2009/0198602 A1 | 8/2009 | Wang et al. |
| 2009/0198612 A1 | 8/2009 | Meimes et al. |
| 2009/0210886 A1 | 8/2009 | Bhojwani et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0234665 A1 | 9/2009 | Conkel |
| 2009/0234775 A1 | 9/2009 | Whitney et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0249440 A1 | 10/2009 | Platt et al. |
| 2009/0254971 A1 | 10/2009 | Herz et al. |
| 2009/0271248 A1 | 10/2009 | Sherman et al. |
| 2009/0271265 A1 | 10/2009 | Lay et al. |
| 2009/0276233 A1 | 11/2009 | Brimhall et al. |
| 2009/0276368 A1 | 11/2009 | Martin et al. |
| 2009/0300066 A1 | 12/2009 | Guo et al. |
| 2009/0313163 A1 | 12/2009 | Wang et al. |
| 2009/0319648 A1 | 12/2009 | Dutta et al. |
| 2009/0327120 A1 | 12/2009 | Eze et al. |
| 2010/0010935 A1 | 1/2010 | Shelton |
| 2010/0094704 A1 | 4/2010 | Subramanian et al. |
| 2010/0094758 A1 | 4/2010 | Chamberlain et al. |
| 2010/0094774 A1 | 4/2010 | Jackowitz et al. |
| 2010/0114724 A1 | 5/2010 | Ghosh et al. |
| 2010/0142698 A1 | 6/2010 | Spottiswoode et al. |
| 2010/0145836 A1 | 6/2010 | Baker et al. |
| 2010/0145847 A1 | 6/2010 | Zarikian et al. |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0198629 A1 | 8/2010 | Wesileder et al. |
| 2010/0211445 A1 | 8/2010 | Bodington |
| 2010/0228657 A1 | 9/2010 | Kagarlis |
| 2010/0250434 A1 | 9/2010 | Megdal et al. |
| 2010/0268557 A1 | 10/2010 | Faith et al. |
| 2010/0293114 A1 | 11/2010 | Khan et al. |
| 2010/0332292 A1 | 12/2010 | Anderson |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0047071 A1 | 2/2011 | Choudhuri et al. |
| 2011/0066495 A1 | 3/2011 | Ayloo et al. |
| 2011/0071950 A1 | 3/2011 | Ivanovic |
| 2011/0076663 A1 | 3/2011 | Krallman et al. |
| 2011/0078073 A1 | 3/2011 | Annappindi et al. |
| 2011/0093383 A1 | 4/2011 | Haggerty et al. |
| 2011/0112958 A1 | 5/2011 | Haggerty et al. |
| 2011/0125595 A1 | 5/2011 | Neal et al. |
| 2011/0137789 A1 | 6/2011 | Kortina et al. |
| 2011/0145122 A1 | 6/2011 | Haggerty et al. |
| 2011/0164746 A1 | 7/2011 | Nice et al. |
| 2011/0173116 A1 | 7/2011 | Yan et al. |
| 2011/0184838 A1 | 7/2011 | Winters et al. |
| 2011/0196791 A1 | 8/2011 | Dominguez |
| 2011/0211445 A1 | 9/2011 | Chen |
| 2011/0218826 A1 | 9/2011 | Birtel et al. |
| 2011/0219421 A1 | 9/2011 | Ullman et al. |
| 2011/0238566 A1 | 9/2011 | Santos |
| 2011/0251946 A1 | 10/2011 | Haggerty et al. |
| 2011/0258050 A1 | 10/2011 | Chan et al. |
| 2011/0270779 A1 | 11/2011 | Showalter |
| 2011/0276396 A1 | 11/2011 | Rathod |
| 2011/0307397 A1 | 12/2011 | Benmbarek |
| 2011/0320307 A1* | 12/2011 | Mehta ................ G06Q 30/0282 705/26.7 |
| 2012/0011056 A1 | 1/2012 | Ward et al. |
| 2012/0011158 A1 | 1/2012 | Avner et al. |
| 2012/0016948 A1 | 1/2012 | Sinha |
| 2012/0029956 A1 | 2/2012 | Ghosh et al. |
| 2012/0047219 A1 | 2/2012 | Feng et al. |
| 2012/0054592 A1 | 3/2012 | Jaffe et al. |
| 2012/0066065 A1 | 3/2012 | Switzer |
| 2012/0101939 A1 | 4/2012 | Kasower |
| 2012/0110677 A1 | 5/2012 | Abendroth et al. |
| 2012/0136768 A1 | 5/2012 | DeBie |
| 2012/0143921 A1 | 6/2012 | Wilson |
| 2012/0158574 A1 | 6/2012 | Brunzell et al. |
| 2012/0158654 A1 | 6/2012 | Behren et al. |
| 2012/0179536 A1 | 7/2012 | Kalb et al. |
| 2012/0215682 A1 | 8/2012 | Lent et al. |
| 2012/0216125 A1 | 8/2012 | Pierce |
| 2012/0239497 A1 | 9/2012 | Nuzzi |
| 2012/0239515 A1 | 9/2012 | Batra et al. |
| 2012/0317016 A1 | 12/2012 | Hughes |
| 2012/0323954 A1 | 12/2012 | Bonalle et al. |
| 2013/0080242 A1 | 3/2013 | Alhadeff et al. |
| 2013/0080467 A1 | 3/2013 | Carson et al. |
| 2013/0085804 A1 | 4/2013 | Leff et al. |
| 2013/0085902 A1 | 4/2013 | Chew |
| 2013/0117832 A1 | 5/2013 | Gandhi |
| 2013/0132151 A1 | 5/2013 | Stibel et al. |
| 2013/0137464 A1* | 5/2013 | Kramer .................. G06Q 30/02 455/456.3 |
| 2013/0159411 A1 | 6/2013 | Bowen |
| 2013/0173450 A1 | 7/2013 | Celka et al. |
| 2013/0173481 A1 | 7/2013 | Hirtenstein et al. |
| 2013/0218638 A1 | 8/2013 | Kilger et al. |
| 2013/0226820 A1* | 8/2013 | Sedota, Jr. .......... G06Q 30/0201 705/319 |
| 2013/0293363 A1 | 11/2013 | Plymouth |
| 2013/0347059 A1 | 12/2013 | Fong et al. |
| 2014/0032265 A1 | 1/2014 | Paprocki et al. |
| 2014/0046887 A1 | 2/2014 | Lessin |
| 2014/0164112 A1 | 6/2014 | Kala |
| 2014/0164398 A1 | 6/2014 | Smith et al. |
| 2014/0181285 A1 | 6/2014 | Stevens et al. |
| 2014/0244353 A1 | 8/2014 | Winters |
| 2014/0278774 A1 | 9/2014 | Cai et al. |
| 2015/0026039 A1 | 1/2015 | Annappindi |
| 2015/0120391 A1* | 4/2015 | Jodice ................ G06Q 30/0204 705/7.33 |

(56) References Cited

U.S. PATENT DOCUMENTS

| | | | | |
|---|---|---|---|---|
| 2015/0120755 | A1* | 4/2015 | Burger | G06Q 50/01 707/748 |
| 2015/0310543 | A1 | 10/2015 | DeBie | |

FOREIGN PATENT DOCUMENTS

| | | |
|---|---|---|
| EP | 0 458 698 | 11/1991 |
| EP | 0 554 083 | 8/1993 |
| EP | 0 559 358 | 9/1993 |
| EP | 0 919 942 | 6/1999 |
| EP | 0 977 128 | 2/2000 |
| EP | 1 077 419 | 2/2001 |
| EP | 0 772 836 | 12/2001 |
| EP | 2 088 743 | 8/2009 |
| JP | 10-222559 | 8/1998 |
| JP | 10-261009 | 9/1998 |
| JP | 10-293732 | 11/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| WO | WO 94/06103 | 3/1994 |
| WO | WO 95/34155 | 12/1995 |
| WO | WO 96/00945 | 1/1996 |
| WO | WO 97/23838 | 7/1997 |
| WO | WO 98/41931 | 9/1998 |
| WO | WO 98/41932 | 9/1998 |
| WO | WO 98/41933 | 9/1998 |
| WO | WO 98/49643 | 11/1998 |
| WO | WO 99/17225 | 4/1999 |
| WO | WO 99/17226 | 4/1999 |
| WO | WO 99/22328 | 5/1999 |
| WO | WO 99/38094 | 7/1999 |
| WO | WO 00/04465 | 1/2000 |
| WO | WO 00/28441 | 5/2000 |
| WO | WO 00/55778 | 9/2000 |
| WO | WO 00/55789 | 9/2000 |
| WO | WO 00/55790 | 9/2000 |
| WO | WO 01/10090 | 2/2001 |
| WO | WO 01/11522 | 2/2001 |
| WO | WO 2004/051436 | 6/2004 |
| WO | WO 2005/124619 | 12/2005 |
| WO | WO 2007/004158 | 1/2007 |
| WO | WO 2007/014271 | 2/2007 |
| WO | WO 2008/022289 | 2/2008 |
| WO | WO 2008/076343 | 6/2008 |
| WO | WO 2008/127288 | 10/2008 |
| WO | WO 2008/147918 | 12/2008 |
| WO | WO 2009/061342 | 5/2009 |
| WO | WO 2009/132114 | 10/2009 |
| WO | WO 2010/045160 | 4/2010 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |

OTHER PUBLICATIONS

U.S. Appl. No. 12/705,511, filed Feb. 12, 2010, Bargoli et al.
BackupBox, http://mybackupbox.com printed Feb. 8, 2013 in 2 pages.
BBC Green Home, "My Action Plan", as printed from The Wayback Machine at http://web.archive.org/web/20080513014731/http://www.bbcgreen.com/actionplan, May 13, 2008, pp. 50.
Berr: Department for Business Enterprise & Regulatory Reform, "Regional Energy Consumption Statistics", Jun. 10, 2008, http://webarchive.nationalarchives.gov.uk/20080610182444/http://www.berr.gov.uk/energy/statistics/regional/index.html.
Bult et al., "Optimal Selection for Direct Mail," Marketing Science, 1995, vol. 14, No. 4, pp. 378-394.
Caliendo, et al., "Some Practical Guidance for the Implementation of Propensity Score Matching", IZA: Discussion Paper Series, No. 1588, Germany, May 2005, pp. 32.
"Carbon Calculator—Calculation Explanation," Warwick University Carbon Footprint Project Group, 2005, pp. 5, http://www.carboncalculator.co.uk/explanation.php.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Elmasri et al., "Fundamentals of Database Systems, Third Edition (Excerpts)", Jun. 2000, pp. 253, 261, 268-270, 278-280, 585, 595.
Energy Saving TrustTM, "HEED Online User Manual (1.7)", Jul. 24, 2008, pp. 18, www.energysavingtrust.org.uk, Jul. 24, 2008.
Experian-Scorex Announces New Credit Simulation Tool, PR Newswire, Costa Mesa, CA, Jun. 13, 2005.
Fanelli, Marc, "Building a Holistic Customer View", MultiChannel Merchant, Jun. 26, 2006, pp. 2.
Haughton et al., "Direct Marketing Modeling with CART and CHAID", Journal of Direct Marketing, Fall 1997, vol. 11, No. 4, pp. 42-52.
Hojoki, http://hojoki.com printed Feb. 8, 2013 in 5 pages.
IFTTT, "About IFTTT," http://ifttt.com/wtf printed Feb. 18, 2013 in 4 pages.
Instant Access to Credit Reports Now Available Online with DMS' CreditBrowser-based system also Simplifies Credit Decisioning and Offers a Central Point of Control, Business Wire, p. 0264, Dallas, May 23, 2000.
"Intelligent Miner Applications Guide", IBM Corp., Apr. 2, 1999, Chapters 4-7, pp. 33-132.
"Japan's JAAI system appraises used cars over internet", Asia Pulse, Mar. 3, 2000.
Jowit, Juliette, "Ever wondered how big your own carbon footprint might be?", Nov. 4, 2007, pp. 4, http://www.guardian.co.uk/money/2007/nov/04/cash.carbonfootprints/print.
Klein, et al., "A Constant-Utility Index of the Cost of Living", The Review of Economic Studies, pp. 84-87, vol. XV-XVI, Kraus Reprint Corporation, New York, 1960.
Klein, et al., "An Econometric Model of the United States: 1929-1952", North-Holland Publishing Publishing Company, Amsterdam, 1955, pp. 4-41.
Klein, Lawrence R., "The Keynesian Revolution", New York, The MacMillan Company, 1947, pp. 56-189.
Lamons, Bob, "Be Smart: Offer Inquiry Qualification Services," Marketing News, ABI/Inform Global, Nov. 6, 1995, vol. 29, No. 23, pp. 13.
Miller, Joe, "NADA used-car prices go online", Automotive News, Jun. 14, 1999, p. 36.
Mint.com, http://www.mint.com/how-it-works/ printed Feb. 5, 2013 in 2 pages.
Mover, "One API for the Cloud," http://mover.io printed Feb. 6, 2013 in 3 pages.
Otixo, "Your Dashboard for the Cloud," http://Otixo.com/product printed Feb. 6, 2013 in 3 pages.
Pipes, http://pipes.yahoo.com/pipes printed Feb. 18, 2013 in 1 page.
Planwise, http://planwise.com printed Feb. 8, 2013 in 5 pages.
Primadesk, http://primadesk.com printed Feb. 8, 2013 in 1 page.
SalesLogix.net, SalesLogix Sales Tour, http://web.archive.org/web/20010411115938/www.saleslogix.com/home/index.php3celli . . . as printed on Aug. 30, 2005, Apr. 2000, 19 Pgs.
Sawyers, Arlena, "NADA to Offer Residual Guide", Automotive News, May 22, 2000, p. 3.

(56) References Cited

OTHER PUBLICATIONS

Schmittlein et al., "Customer Base Analysis: An Industrial Purchase Process Application", Marketing Science, vol. 13, No. 1 (Winter 1994), pp. 41-67.
ServiceObjects, "DOTS Web Services—Product Directory", http://www.serviceobjects.com/products/directory_of_web_services.asp printed Aug. 17, 2006 in 4 pages.
Storage Made Easy(SME), http://storagemadeeasy.com printed Feb. 6, 2013 in 1 page.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
Stone, "Linear Expenditure Systems and Demand Analysis: An Application to the Pattern of British Demand", The Economic Journal: The Journal of The Royal Economic Society, Sep. 1954, pp. 511-527, vol. LXIV, Macmillan & Co., London.
Tao, Lixin, "Shifting Paradigms with the Application Service Provider Model"; Concordia University, IEEE, Oct. 2001, Canada.
Thoemmes, Felix, "Propensity Score Matching in SPSS", Center for Educational Science and Psychology, University of Tübingen, Jan. 2012.
"WashingtonPost.com and Cars.com launch comprehensive automotive web site for the Washington area", PR Newswire, Oct. 22, 1998.
Wiedmann, et al., "Report No. 2: The use of input-output analysis in REAP to allocate Ecological Footprints and material flows to final consumption categories", Resources and Energy Analysis Programme, Stockholm Environment Institute—York, Feb. 2005, York, UK, pp. 33.
Working, Holbrook, "Statistical Laws of Family Expenditure", Journal of the American Statistical Association, pp. 43-56, vol. 38, American Statistical Association, Washington, D.C., Mar. 1943.
Zapier, "Integrate Your Web Services," http://www.Zapier.com printed Feb. 18, 2013 in 3 pages.
"A New Approach to Fraud Solutions", BasePoint Science Solving Fraud, pp. 8, 2006.
"Aggregate and Analyze Social Media Content: Gain Faster and Broader Insight to Market Sentiment," SAP Partner, Mantis Technology Group, Apr. 2011, pp. 4.
AKL, Selim G., "Digital Signatures: A Tutorial Survey," Computer, Feb. 1983, pp. 15-24.
"Auto Market Statistics:Drive Response with Aggregated Motor Vehicle Information"; Experian; Apr. 2007; http://www.experian.com/assets/marketing-services/product-sheets/auto-market-statistics.pdf.
Adzilla, Press Release, "Zillacasting Technology Approved and Patent Pending," http://www.adzilla.com/newsroom/pdf/patent_051605.pdf, May 16, 2005, pp. 2.
Alexander, Walter, "What's the Score", ABA Banking Journal, vol. 81, 1989. [Journal Article Excerpt].
"Bank of America Launches Total Security Protection™; Features Address Cardholders' Financial Safety Concerns; Supported by $26 Million National Advertising Campaign; Free Educational Materials", PR Newswire, Oct. 9, 2002, pp. 2.
"Beverly Hills Man Convicted of Operating 'Bust-Out' Schemes that Caused More than $8 Million in Losses", Department of Justice, Jul. 25, 2006, 2 Pgs.
Burr Ph.D., et al., "Utility Payments as Alternative Credit Data: A Reality Check", Asset Builders of America, Inc., Oct. 5, 2006, pp. 1-18, Washington, D.C.
Burr Ph.D., et al., "Payment Aggregation and Information Dissemination (Paid): Annotated Literature Search", Asset Builders of America, Inc., Sep. 2005.
"Bust-Out Schemes", Visual Analytics Inc. Technical Product Support, Newsletter vol. 4, Issue 1, Jan. 2005, pp. 7.
Chandler et al., "The Benefit to Consumers from Generic Scoring Models Based on Credit Reports", The MDS Group Atlanta, Georgia, Jul. 1, 1991, Abstract.

"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003.
Davies, Donald W., "Applying the RSA Digital Signature to Electronic Mail," Computer, Feb. 1983, pp. 55-62.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, 2009, pp. 164.
Experian: Mosaic United Kingdom, Brochure, Jun. 2009, pp. 24.
Experian: Mosaic UK-Optimise the Value of Your Customers and Locations, Now and in the Future, Brochure, 2010, pp. 24.
Experian: Mosaic UK—Unique Consumer Classification Based on In-Depth Demographic Data, as printed from http://www.experian.co.uk/business-strategies/mosaic-uk.html, Jul. 30, 2012, pp. 2.
Experian: Mosaic USA, Brochure, May 2009, pp. 14.
Experian: Mosaic USA-Consumer Lifestyle Segmentation [Data Card], Dec. 2009, pp. 2.
Experian: Public Sector, as printed form http://publicsector.experian.co.uk/Products/Mosaicpublicsector.aspx, 2012, pp. 2.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
"Fighting the New Face of Fraud", FinanceTech, http://www.financetech.com/showArticle.jhtml?articleID=167100405, Aug. 2, 2005.
Findermind, "PeopleFinders Review", as archived Jun. 1, 2012 in 4 pages. http://web.archive.org/web/20120601010134/http://www.findermind.com/tag/peoplefinders-review/.
Frontporch, "Ad Networks-Partner with Front Porch!," www.frontporch.com printed Apr. 2008 in 2 pages.
Frontporch, "New Free Revenue for Broadband ISPs!", http://www.frontporch.com/html/bt/FPBroadbandISPs.pdf printed May 28, 2008 in 2 pages.
Garcia-Molina, "Database Systems: The Complete Book", Prentice Hall, 2002, pp. 713-715.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Kessler, Josh "How to Reach the Growing 'Thin File' Market: Huge Immigration Market and Other Groups with Little or No Credit History May Be Creditworthy. There are Several Ways to Tap This Well of Business", ABA Banking Journal, vol. 97, 2005.
King et al., Local and Regional CO2 Emissions Estimates for 2004 for the UK, AEA Energy & Environment, Report for Department for Environment, Food and Rural Affairs, Nov. 2006, London, UK, pp. 73.
Kohavi, Ron, "A Study of Cross-Validation and Bootstrap for Accuracy Estimation and Model Selection", Internation Joint Conference on Artificial Intelligence, 1995, pp. 7.
Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.
LifeLock, http://web.archive.org/web/20110724011010/http://www.lifelock.com/? as archived Jul. 24, 2011 in 1 page.
McNamara, Paul, "Start-up's pitch: The Envelope, please," Network World, Apr. 28, 1997, vol. 14, No. 17, p. 33.
"Mosaic" (geodemography), available from http://en.wikipedia.org/wiki/Mosaic_(geodemography), as last modified Jul. 13, 2012. pp. 4.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.

(56) References Cited

OTHER PUBLICATIONS

NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.
Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.
Padgett et al., "A Comparison of Carbon Calculators", Environmental Impact Assessment Review 28, pp. 106-115, Jun. 7, 2007.
Perry et al., "Integrating Waste and Renewable Energy to Reduce the Carbon Footprint of Locally Integrated Energy Sectors", Energy 33, Feb. 15, 2008, pp. 1489-1497.
Phorm, "BT PLC TalkTalk and Virgin Media Inc. confirm exclusive agreements with Phorm", Press Release, http://www.phorm.com/about/launch_agreement.php, Feb. 14, 2008, pp. 2.
Phorm, "The Open Internet Exchange, 'Introducing the OIX'", http://www.phorm.com/oix/ printed May 29, 2008 in 1 page.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
"PostX to Present at Internet Showcase", PR Newswire, Apr. 28, 1997, pp. 2.
PostX, "PostX® Envelope and ActiveView", http://web.archive/org/web/19970714203719/http://www.postx.com/priducts_fm.html, Jul. 14, 1997 (retrieved Nov. 7, 2013) in 2 pages.
"PremierGuide Announces Release 3.0 of Local Search Platform", Business Wire, Mar. 4, 2004, Palo Alto, CA, p. 5574.
PrivacyGuard, http://web.archve.org/web/20110728114049/http://www.privacyguard.com/ as archived Jul. 28, 2011 in 1 page.
RapUP, Attribute Management & Report Systems: Absolute Advantage!, Magnum Communications Brochure, Copyright 2004, pp. 5.
Rodgers, Zachary, "ISPs Collect User Data for Behavioral Ad Targeting", ClickZ, www.clickz.com/showPage.html?page=clickz, Jan. 3, 2008, pp. 3.
Rosset et al., "Wallet Estimation Models", IBM TJ Watson Research Center, 2005, Yorktown Heights, NY, pp. 12.
Sakia, R.M., "The Box-Cox Transformation Technique: a Review", The Statistician, 41, 1992, pp. 169-178.
ShoeBoxed, https://www.shoeboxed.com/sbx-home/ printed Oct. 16, 2012 in 4 pages.
Smith, Richard M., "The Web Bug FAQ", Nov. 11, 1999, Version 1.0, pp. 4.
Sumner, Anthony, "Tackling the Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
White, Ron, "How Computers Work", Millennium Edition, Que Corporation, Indianapolis, IN, Sep. 1999. [Uploaded in 2 parts].
Wilson, Andrea, "Escaping the Alcatraz of Collections and Charge-Offs", http://www.transactionworld.net/articles/2003/october/riskMgmt1.asp, Oct. 2003.
Declaration of Paul Clark, DSc. for Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *ExperianMarketing Solutions. Inc.*, No. 2:12-cv-00513-JRG (E.D. Tex.)) Filed Jan. 14, 2014 in 9 pages.
First Amended Complaint in Civil Action No. 2:12-cv-511-JRG (*Rpost Holdings, Inc. and Rpost Communications Limited* V. *Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited* V. *Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited* V. *Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.
International Search Report and Written Opinion in PCT Application No. PCT/US07/76152, dated Mar. 20, 2009.
International Search Report and Written Opinion for Application No. PCT/US2008/064594, dated Oct. 30, 2008.
International Preliminary Report and Written Opinion in PCT/US2008/064594, mailed Dec. 10, 2009.
International Search Report and Written Opinion for Application No. PCT/US2013/052342, dated Nov. 21, 2013.
International Preliminary Report on Patentability for Application No. PCT/US2013/052342, dated Feb. 5, 2015.

* cited by examiner

WWW.KEEPINGUPWITHTHEJONES.COM

Keeping up with the Jones's

Compare Yourself To Other People Who:

Work as Teachers
Live in California
Own a Home
Are Between 25-30
Drive a Truck
Live in your zip code Enter a name or characteristic to see how you compare:

Jones Rating Trends

+34% over last month – Software Programmers in Pacific NW
-20% since yesterday – East Florida Residents
-5% since last week – U.S. Senators and Representatives Average Ratings:

My hometown: 84 (+1 in last month)

My Current Town:: 82 (-2 in last month)

My School: 87 (unchanged in last month)

My Career: 90 (+2 in last month)

FIGURE 1

WWW.KEEPINGUPWITHTHEJONES.COM

Keeping up with the Jones's

Compare Yourself To Other People Who:

Work as Teachers
Live in California
Rent an Apartment
Are between 25-30
Drive a car from the '90s Enter a name or characteristic to see how you compare:

Are You Keeping Up With the Jones's?

Your Score: 18                     Neighbor's Average Score: 89

| | Your Attributes: | | Neighbor's Average Attributes: |
|---|---|---|---|
| Car: | 1998 Ford Focus | ✓ | 2009 Luxury Sedan |
| Profession: | Teacher | ✓ | Medical Professional |
| Earn: | $40,000 | ✓ | $120,000 |
| Residence: | Rent 1-bed Apt. | ✓ | Own-4 bed 2.5 bath |
| Marital Status: | Single | ✓ | Married |
| Children: | Three | ✓ | Two |
| Education: | 4-year college | ✓ | Graduate/Professional School |
| Friends: | 25 | | 750 |

You are not keeping up with your neighbors. Click here to view advice and offers that will help you improve your Jones Rating

FIGURE 2

Keeping up with the Jones's

WWW.KEEPINGUPWITHTHEJONES.COM

Compare Yourself To Other People Who:

Work as Teachers
Live in California
Rent an Apartment
Are Between 25-30
Drive a car from the 90s Enter a name or characteristic to see how you compare:

Are You Keeping Up With the Jones's?

| | Your Attributes: | | Neighbor's Attributes: |
|---|---|---|---|
| Car | 1998 Ford Focus | ✓ | 2009 Luxury Sedan |
| Profession: | Teacher | ✓ | Medical Professional |
| Earn: | $40,000 — 312 | ✓ | $120,000 |
| Residence: | | ✓ | Own-4 bed 2.5 bath |
| Marital Status: | Single | ✓ | Married |
| Children: | Three | | Two |
| Education: | 4-year college | ✓ | Graduate/Professional School |

You are not keeping up with your neighbors. Click here to view advice and offers that will help you improve your Jones Rating

FIGURE 3

WWW.KEEPINGUPWITHTHEJONES.COM

Keeping up with the Jones's

| | Your Score: 78 | | Eric Jones's Score: 82 |
|---|---|---|---|
| | Your Attributes: | | Eric Jones's Attributes: |
| Marital Status: | Married | > > | Single |
| Friends: | 785 | | 46 |
| Profession: | Teacher | > | Medical Professional |
| Children: | Two | | Two |
| Car: | 1998 Ford Focus | > > > > | 2009 Audi A6 |
| Income: | $40,000 | > > > > | $120,000 |
| Residence: | Rent 1-bed Apt. | > > > > | Own-4 bed 2.5 bath |
| Education: | 4-year college | > > > > | Graduate/Professional School |

410

Compare Yourself To Other People Who:

Work as Teachers
Live in California
Rent an Apartment
Age between 25-30
Drive a car from the '90s Enter a name or characteristic to see how you compare:

KEEPING UP WITH THE JONESES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Consumers often want to compare themselves with others.

SUMMARY

In one embodiment, a computing system for providing user comparison information to a user comprises one or more computer processors configured to execute software instructions and a non-transitory computer readable storage device configured to store software instructions executable by the one or more computer processors. In one embodiment, the software instructions are configured to cause the computing system to access demographic data regarding a user of a computing device, the demographic data including demographic attributes in three or more of the following categories: marital status, friends, profession, children, automobile, income level, residence, education level; receive, from the user, an indication of a comparison individual; access comparison demographic data regarding the comparison individual, the comparison demographic data including comparison demographic attributes in three or more of the following categories: marital status, friends, profession, children, automobile, income level, residence, education level; and access a data structure storing information regarding most favorable levels of respective demographic attributes, wherein for a first category of demographic attributes the data structure indicates that a higher number is more favorable and for a second category of demographic attributes the data structure indicates that a lower number is more favorable. In one embodiment, the software instructions are further configured to, for each of the categories, compare a value of the demographic attribute of the user with a value of the comparison demographic attribute of the comparison individual, based on the information stored in the data structure regarding most favorable levels of demographic attributes associated with the category, determine which of either the user or the comparison individual has a most favorable demographic attribute for the category, and generate a user interface listing each of the categories, demographic attributes for the user in each of the categories, demographic attributes for the comparison individual in each of the categories, and, for each of the categories, a visual indication of which of the user or the comparison individual has a demographic attribute that is most favorable.

In another embodiment, a computing system for providing user comparison information to a user comprises one or more computer processors configured to execute software instructions and a non-transitory computer readable storage device configured to store software instructions executable by the one or more computer processors. In one embodiment, the software instructions are configured to cause the the computing system to access demographic data regarding a user of a computing device, the demographic data including demographic attributes in three or more of the following categories: marital status, friends, profession, children, automobile, income level, residence, education level, determine a group of comparison individuals each having one or more demographic attributes in common with the user, access comparison demographic data regarding the group of comparison individuals, the comparison demographic data including comparison demographic attributes in three or more of the following categories: marital status, friends, profession, children, automobile, income level, residence, education level, and access a data structure storing rules for ranking levels of respective demographic attributes, wherein for a first category of demographic attributes the data structure indicates that rankings in the first category increase as values of demographic attributes increase, and for a second category of demographic attributes the data structure indicates two or more possible values of demographic attributes in the second category and an indication of relative rankings of the two or more possible values with reference to one another. In one embodiment, the software instructions are further configured to, for each of the categories, compare a value of the demographic attribute of the user with a value of the comparison demographic attribute of the group of comparison individuals; and based on the ranking information, determine which of either the user or the comparison group of individuals has a higher rank for the category. In one embodiment, the software instructions are further configured to generate a user interface listing each of the categories, demographic attributes for the user in each of the categories and demographic attributes for the group of comparison individuals in each of the categories, and, for each of the categories, a visual indication of which of the user or the group of comparison individuals has a demographic attributes that is highest rated.

BRIEF DESCRIPTION OF THE DRAWINGS

FIG. 1 illustrates an example user interface that may be part of a user comparison website.

FIG. 2 illustrates another example user interface that may be provided to a user as part of a user comparison website.

FIG. 3 illustrates another example user interface that may be provided to the user as part of a user comparison website.

FIG. 4 illustrates another example user interface that may be provided to a user as part of a user comparison website.

FIG. 7 illustrates an example user interface that allows the user to choose attributes that are included in user ratings calculated by the system, such as ratings calculated for the user as well as comparison individuals or groups of individuals.

DETAILED DESCRIPTION

Figure 5:
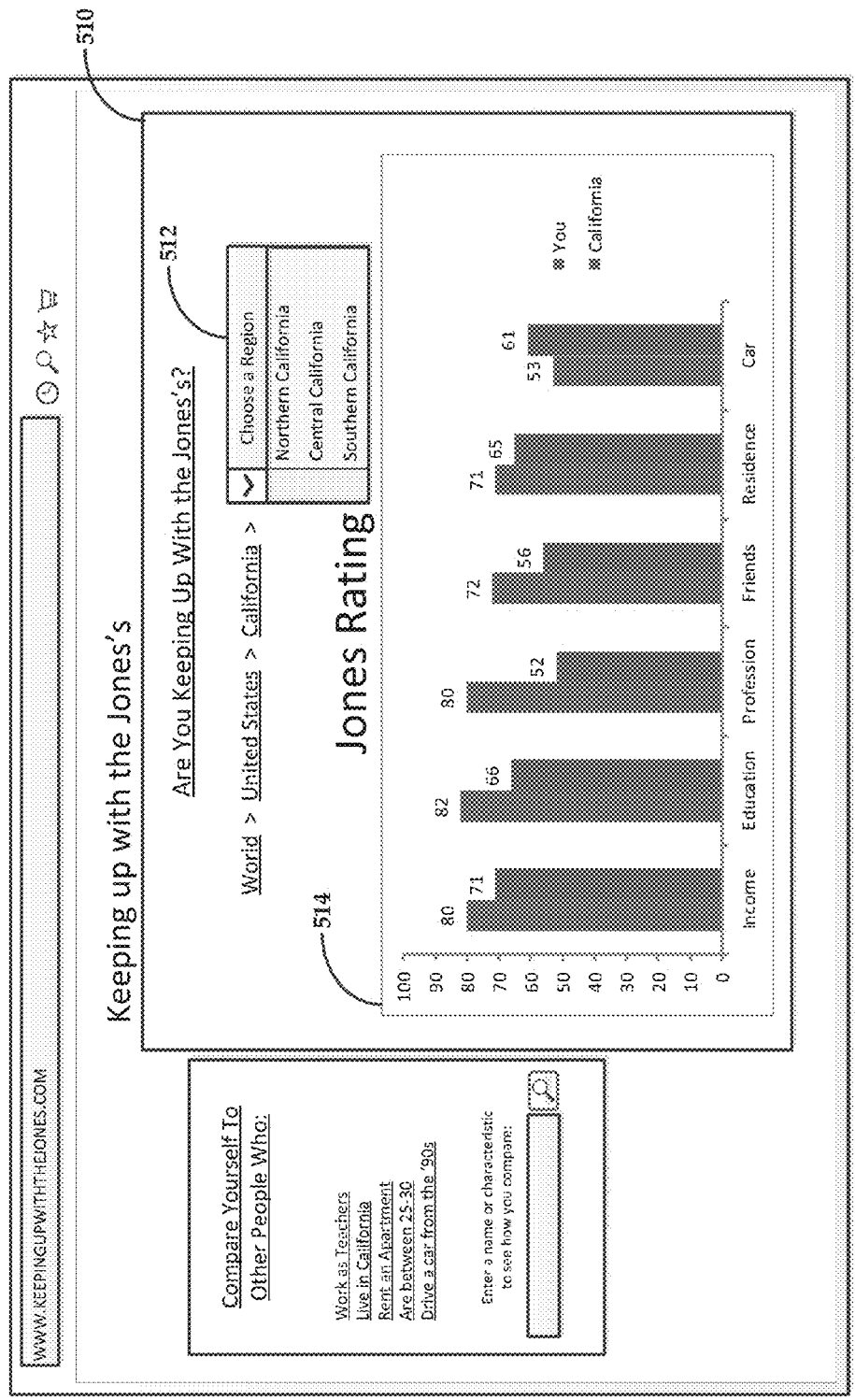
FIG. 5 illustrates another example user interface that includes a user rating graph comparing the user's overall rating with reference to individuals in various geographic groupings.

FIG. 1 illustrates an example user interface that may be part of a user comparison website. The various user interfaces discussed herein, and illustrated in the various figures, may be provided to a consumer via a web browser, a standalone application, or in any other manner. Similar user interfaces may be provided via mobile devices or other computing devices. Certain user interfaces are captioned "Keeping up with the Joneses." In other embodiments, other captions may be used, such as a "user comparison website" or the like. In this example, as well as other examples herein, a "Jones rating" (synonymous with a "user rating") is discussed, which in general provides some indication of an individual's (or some group of individuals) attributes as compared to one or more other individuals (or groups of individuals). However, this name is arbitrary and the systems and methods discussed herein are not limited to scores with these names.

In the example of FIG. 1, the user interface 100 includes several sections of information. In this particular example, the user interface 100 includes a section 110 that includes options for groups of individuals that a user may select in order to compare attributes of the user to users of any selected groups. For example, the section 110 includes options to select (for comparison) groups of individuals that work as teachers, live in California, own a home, are between 25-30 years old, drive a truck, live in a common ZIP Code as the current user, etc. As discussed further below, such comparisons may provide the user with various comparison points of the users financial, social, mental, or other characteristics as compared with these various groups of other individuals.

The user interface 100 also includes a section 120 labeled "Jones Rating Trends." In section 120, general trends in Jones ratings are provided, which in general indicate groups of individuals that have had significant changes (e.g., increases or decreases) in one or more attributes. In the example of FIG. 1, the trends include an indication that software programmers in the Pacific Northwest had Jones ratings that increased an average of 34% over the previous month, while East Florida residents had Jones ratings that decreased an average of 20% in the last day. The underlying attributes of the individuals used in determining such trends may vary from one application to another. Many of these attributes are discussed below, but other attributes may be used in other embodiments. In one embodiment, the user interface allows the user to view detailed information regarding calculation of the trends, such as to view a breakdown of attributes of consumers that contributed to changes in Jones ratings.

The user interface also includes an average ratings section 130 that includes information regarding particular groups of individuals, such as those that may have been previously selected by the user or automatically selected by the user. In this example, the average ratings are provided for individuals in the user's hometown, the user's current town, the user's school (e.g., high school, college, or both), and individuals in the same career as the current user. In other embodiments, other average ratings for other groups may be provided. Similarly, groups that are included in the average ratings section may be automatically selected by the computing system.

FIG. 2 illustrates another example user interface that may be provided to a user as part of a user comparison website. In the example of FIG. 2, the user interface includes a side-to-side comparison of the current user's attributes (e.g., some subset of attributes of the user, such as those that may be manually selected by the user and/or automatically selected by the computing system) as compared to the same attributes of one or more neighbors (or other individuals), such as a handful of neighbors within a local area of the current user. In this example user interface 210, the current user has a score of 18, while the user's neighbors have an average score of 89. The discrepancy between the scores may be at least partially attributable to differences in the attributes listed in user interface 210. For example, the user interface indicates, with the checkmarks, that the user's average neighbor is better off than he is in most categories, including, car, profession, earnings, residence, marital status, education, and friends. The user interface indicates that the current user is only doing better than his neighbors in the quantity of children (although in other embodiments having more children may not be seen as an advantage, or possibly having more children over a predefined threshold, such as two, will start to decrease the perception of advantage used by the computing system in comparing with others).

The example of FIG. 2 further includes, in section 220, a summary of the findings with reference to the comparison of the user and the selected group (e.g., in this example the indication is that "You are not keeping up with your neighbors."), as well as a link that provides the user with possible advice and offers that may help improve the user's rating. In the example of FIG. 2, because the user has a car attribute that is perceived as being not as advantageous as the neighbors average car attribute, the link in section 220 may provide car buying and/or financing options to the user. Similarly, with reference to the profession attribute, information regarding available jobs that are more highly sought after (and/or pay more, are from companies that are more highly reviewed by employees, etc.), may be provided by selecting the link in section 220. With reference to the other attributes, similar ideas and/or offers for improving the users rating may be provided. In one embodiment, such ideas and/or offers may be provided, and possibly preapproved, based on attributes of the user.

FIG. 3 illustrates another example user interface 310 that may be provided to the user as part of a user comparison website. In this example, the residence attribute for the current user is not known by the system. For example, the residence information has not been provided by the user and/or was not locatable from one or more publicly (or privately) available websites that provide such information and to which the provider of the user comparison website has access. Thus, in this embodiment a text entry field 312 is provided in place of the residence attribute, with an invitation for the user to provide current residence information. In some embodiments, the user may be motivated to provide residence information in the text entry field 312 in order to obtain a determination as to whether the user is doing better than his/her neighbors (or other groups in other embodiments) with reference to that attribute and/or a total rating. For example, if the user does have a better house then his average neighbors, the user may be motivated to provide that house information so that his overall score is improved based on the residence attribute being more favorable than his neighbors.

FIG. 4 illustrates another example user interface 410 that may be provided to a user as part of a user comparison website. The user interface 410 compares the user with a particular individual. The individual may be a neighbor, friend, an acquaintance, a business partner or adversary, a celebrity, sports star, etc. The individual may be selected by the user and/or automatically selected by the system. In the example of FIG. 4, scores (ratings) are provided for the user and for a comparison user, Eric Jones in this example. As shown, the user has a slightly lower score than Eric Jones, based on less favorable ratings with reference to car, income, residence, and education attributes. In one embodiment, differences in attribute values between the user and the comparison individual (or group of comparison individuals in other embodiments, such as those discussed above) may be considered in determining scores.

FIG. 5 illustrates another example user interface 510 that includes user rating graph 514 comparing the user's overall rating with reference to individuals in various geographic groupings. In the example of FIG. 5, a drop-down menu 512 allows the user to select a geographic region for comparison, such as regions surrounding a residence or work location of the user. Alternatively, the user can drill down from a broad geographic region that is initially presented (e.g., the world or a specific country or continent), to as narrow of a comparison as is wanted, such as to a ZIP-9 area or even an individual household or person. In the example of FIG. 5, the comparison graph 514 compares various attributes of the current user with other individuals within the state of California. As shown, the current user has higher scores in each of income, education, profession, friends, and residence attributes, but a lower score in the car attribute. The drop-down menu 512 may be used from this view to further drill down to a particular section of California, such as Northern California, Central California, or Southern California.

Figure 6:
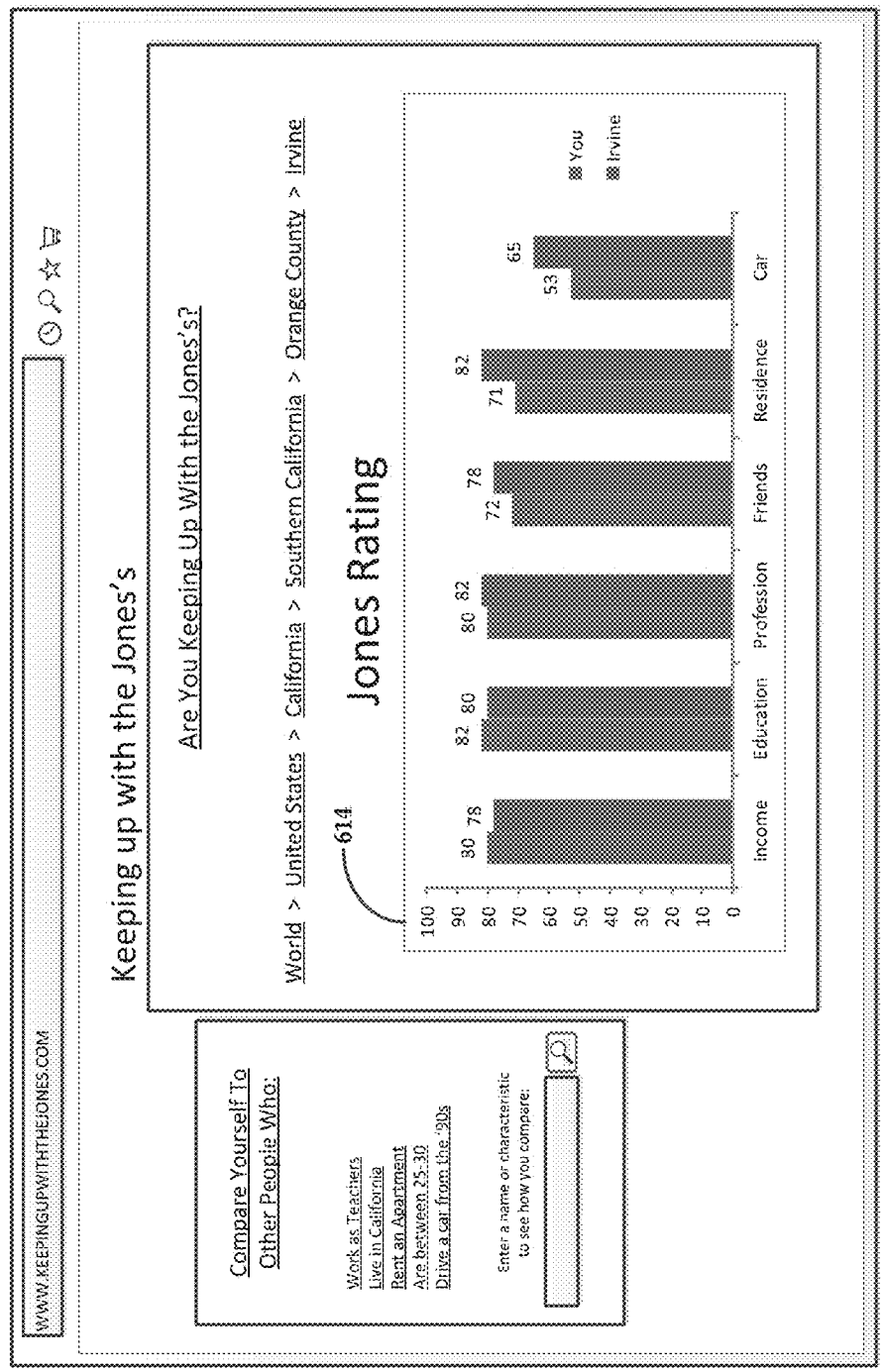
FIG. 6 illustrates a similar graph to that of FIG. 5 after a few more stages of drill down have been performed.

FIG. 6 illustrates a similar graph after a few more stages of drill down have been performed. In this particular example, the user has drilled down from California, to Southern California, to Orange County, and then to Irvine. Thus, the comparisons in the chart 614 can include comparison of the user's scores in each of the attributes with other individuals within the specific city of Irvine, Calif. In this comparison, the user attribute scores (ratings) are generally more comparable to the selected group of individuals (e.g., in Irvine, Calif.).

Figure 7:
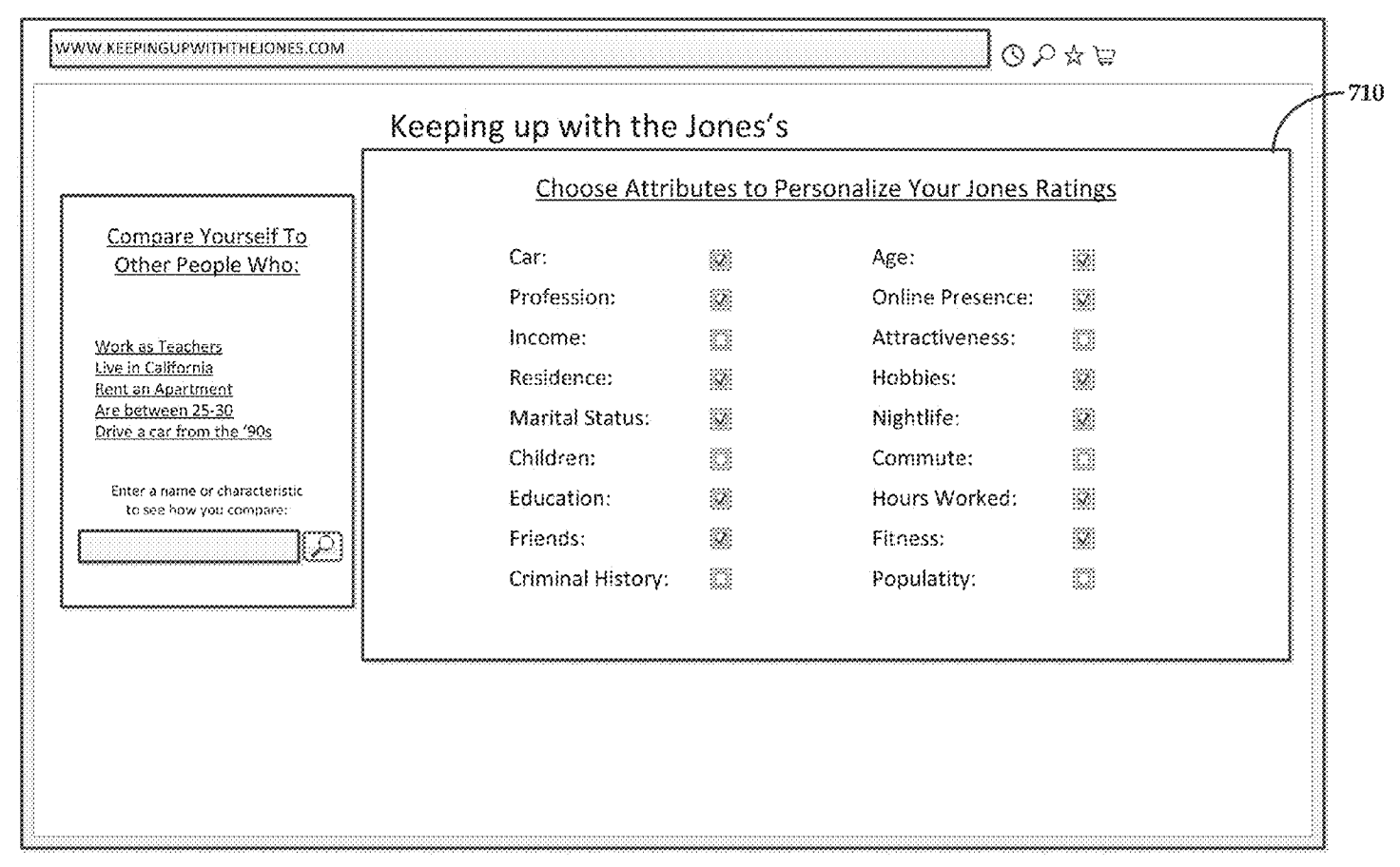

FIG. 7 illustrates an example user interface 710 that allows the user to choose attributes that are included in user ratings calculated by the system, such as ratings calculated for the user as well as comparison individuals or groups of individuals. In this example, the user can select attributes for inclusion in user ratings (or click a selected attributes checkbox in order to remove that attribute from inclusion in calculated user ratings). In other embodiments, other attributes are available. Similarly, other user interface controls and mechanisms may be used for a user to customize attributes that are included in user ratings.

Figure 8A:
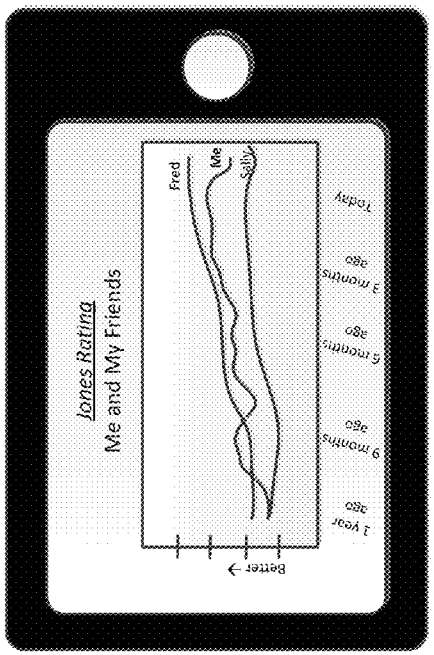
FIGS. 8A, 8B, 8C, and 8D are example user interfaces that may be provided to a user to illustrate various other comparisons of user ratings.
Figure 8B:
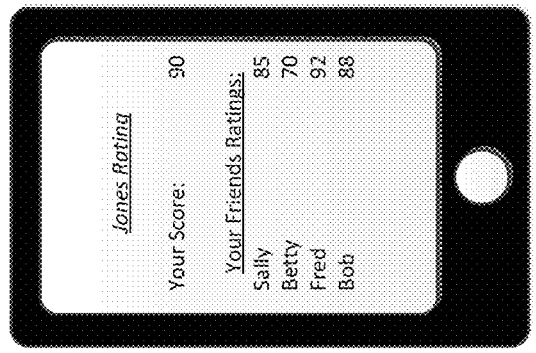
Figure 8C:
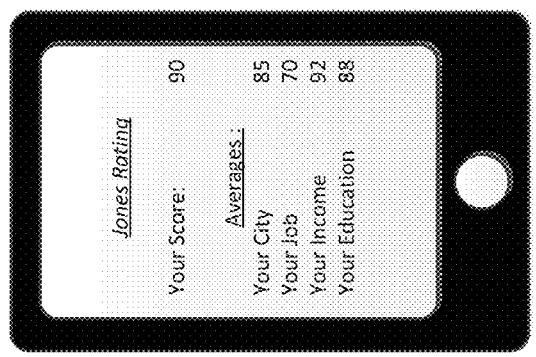
Figure 8D:
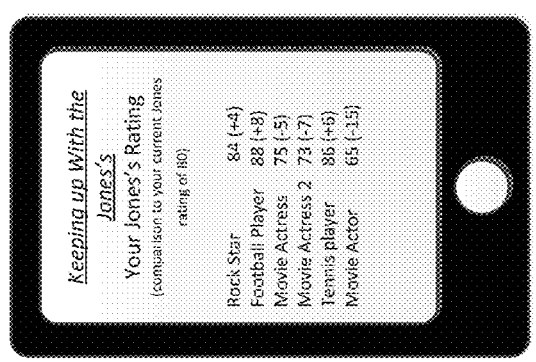

FIGS. 8A, 8B, 8C, and 8D are example user interfaces that may be provided to a user to illustrate various other comparisons of user ratings. These examples are illustrated as displayed on a mobile device, but similar user interfaces may be displayed on other computing devices such as a tablet, desktop computer, etc. In the example of FIG. 8A, the user interface illustrates a line graph extending over a period of one year and comparing user scores of a current user and two other individuals. For example, the overall user scores (e.g., considering multiple attributes that are selected by the user) of the users are included in the graph. In one embodiment the user can adjust attributes that are used in calculating ratings and, based on such changes, the graphs of the users rating over the previous year, as well as the graphs of the comparison individual's ratings over the previous year, may change. FIG. 8B provides comparisons of user ratings of the individual with popular categories of other individuals. In this example, the user ratings of rock stars, football players, movie actresses, tennis players, movie actors, etc., may be displayed, as well as a differential of those groups of individuals as compared to the users current user score. In one embodiment, individual names are provided in the example of FIG. 8B, such as the names of a particular rockstar, football player, movie actress, etc., and the corresponding user scores are associated with those individuals. In this way, the user can easily visualize how the various attributes of the user compare with particular individuals that are commonly compared to. FIG. 8C illustrates the current users rating, as well as ratings average ratings of individuals in several categories. FIG. 8D includes the user's current score, as well as the user scores of certain friends of the user.

Figure 9A:
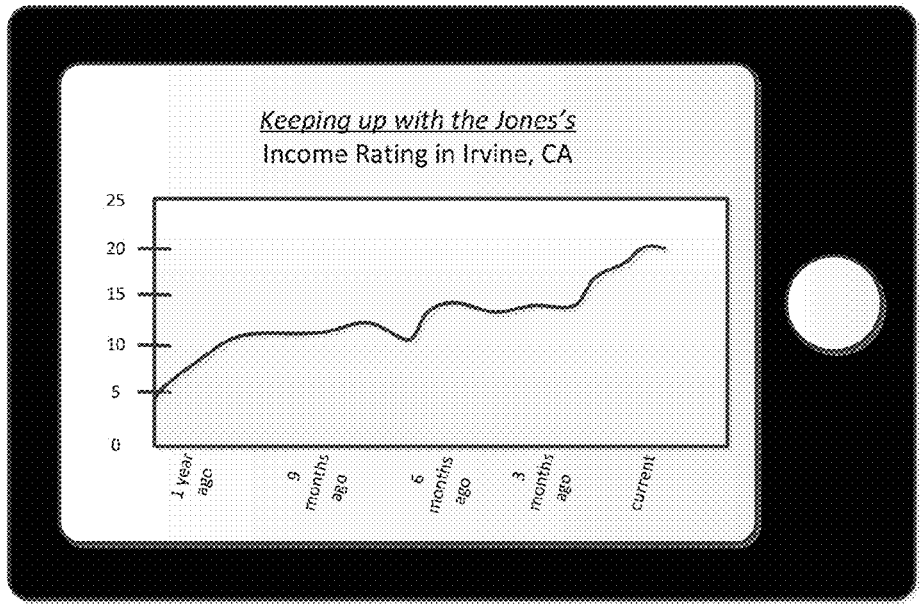
FIGS. 9A and 9B illustrate further graphs for comparison of various user attributes.
Figure 9B:
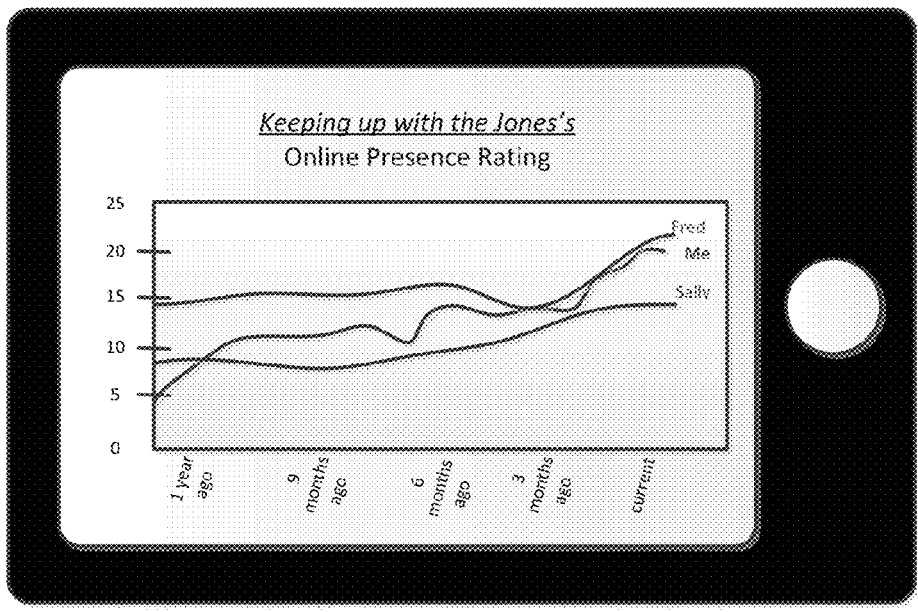

FIGS. 9A and 9B illustrate further graphs for comparison of various user attributes. In the example of FIG. 9A, the income attributes for individuals living in a particular geographic region (Irvine, Calif. in this example) over a one-year time period are illustrated. Other groups of individuals and other attributes may be selected for display in a similar graph. For example, in FIG. 9B, a particular attribute with reference to three individuals is shown on a one-year graph.

System Block Diagram

Figure 10:
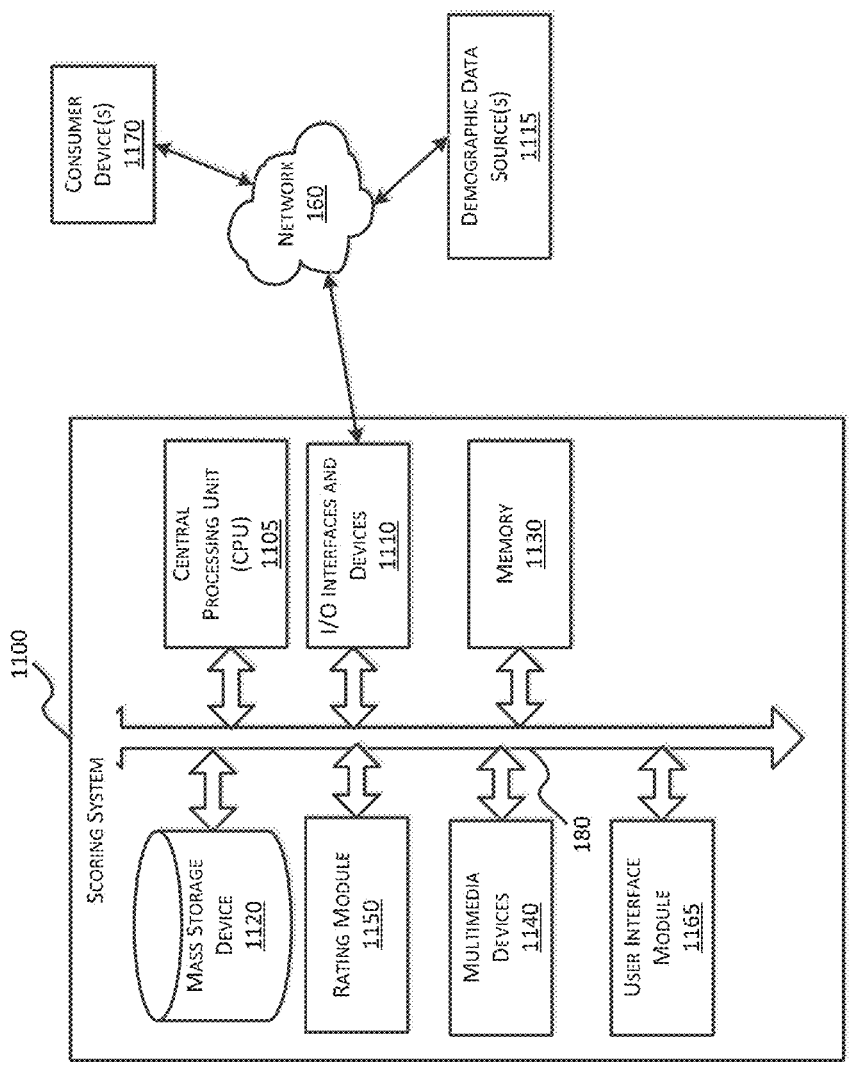
FIG. 10 is a block diagram illustrating one embodiment of a scoring system that may be used to implement certain systems and methods discussed herein, such as generating user scores, gathering information from one or more data sources that are used in generating user scores, and/or generating various user interfaces (such as those discuss above) for use by users.

FIG. 10 is a block diagram illustrating one embodiment of a scoring system 1100 that may be used to implement certain systems and methods discussed herein, such as generating user scores, gathering information from one or more data sources that are used in generating user scores, and/or generating various user interfaces (such as those discuss above) for use by users. In particular, the scoring system 1100 may be used to gather data, analysis data, and generate the various user interfaces discussed above and/or illustrated in the figures. In some embodiments, the systems and methods discussed above may be performed by a combination of computing devices, such as the scoring system 1100 and the consumer device 1170. In some embodiments, the other computing devices discussed herein, such as the computing devices 1170, may include some or all of the same components as discussed below with reference to scoring system 1100. Furthermore, depending on the embodiment, certain modules may be performed by different and/or multiple computing devices.

In one embodiment, the scoring system 1100 is configured to interface with multiple devices and/or data sources. The scoring system 11100 may be configured to implement certain systems and methods described herein. The functionality provided for in the components and modules of the scoring system 1100 may be combined into fewer components and modules or further separated into additional components and modules. In the embodiment of FIG. 1, the scoring system 1100 may include modules that may be executed by CPU 1105 such as rating module 1150 and a user interface module 1165.

In some embodiments, the scoring system 1100 includes a rating module 1150, which performs various tasks of gathering data regarding consumers, such as from the demographic data source(s) 1115, and generating attribute and overall scores for the individuals (or groups of individuals). The scoring system 1100 may also include a user interface module 1165 configured to generate various user interfaces for presentation of data to the user of consumer device 1170, such as those user interfaces discussed above.

Client computing device 1170, which may comprise software and/or hardware that implements the user interface module 1165, may be an end user computing device that comprises one or more processors able to execute programmatic instructions. Examples of such a computing device 1170 are a desktop computer workstation, a smart phone such as an Apple iPhone or an Android phone, a computer laptop, a tablet PC such as an iPad, Kindle, or Android tablet, a video game console, or any other device of a similar nature. In some embodiments, the client computing device 1170 may comprise a touch screen that allows a user to communicate input to the device using their finger(s) or a stylus on a display screen. The computing device 1170 and/or scoring system 1100 may comprise storage systems such as a hard drive or memory, or comprise any other non-transitory data storage medium. The storage systems may be configured to store executable instructions that may be executed by one or more processors to perform computerized operations on the client computing device 1170, such as accept data input from a user (e.g., on the touch screen), and/or provide output to a user using the display. These executable instructions may be transmitted to another device for execution or processing by the device to implement the systems and methods described herein.

The various computing devices illustrated in FIG. 1 may be in direct communication with the scoring system 1100 or may be in communication with the scoring system 1100 via the network 1160, which may include any combination of networks, such as local area, wide area, Internet, etc., by way of a wired network, such as an ethernet LAN or cable modem, or via a wireless method, such as through an 802.11 access point or via a cell phone network. The network 1160 allows computing devices to send (i.e. transmit) and receive electronic transmissions.

Example Computing System Components

In general, the word module, as used herein, refers to logic embodied in hardware or firmware, or to a collection of software instructions, possibly having entry and exit points, written in a programming language such as, for example, C, C++, C#. Software modules may be compiled and linked into an executable program, installed in a dynamic link library, or may be written in an interpreted programming language such as, for example, BASIC, Java, Perl, or Python. It will be appreciated that software modules may be callable from other modules or from themselves or may be invoked in response to detected events and interrupts, or both. The modules included in the scoring system 1100 may be stored in the mass storage device 1120 as executable software codes that are executed by the CPU 1105. Modules in the scoring system 1100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, such as the computing device 1100, for execution by the computing device. Software instructions may be embedded in firmware, such as an EPROM. It will be further appreciated that hardware modules may be comprised of connected logic units, such as programmable gate arrays or processors. The modules described herein are preferably implemented as software modules, but may be represented in hardware or firmware. Generally, the modules described herein refer to logical modules that may be combined with other modules or devices into sub-modules despite their physical organization or storage. Other computing systems, such as, computing device 1170, may comprise similar computing hardware, software, and functionality as described in reference to scoring system 1100.

In one embodiment, the scoring system 1100 includes, for example, one or more servers or personal computers that are IBM, Macintosh, or Linux/Unix compatible. In another embodiment, the scoring system 1100 includes one or more laptop computers, smart phones, personal digital assistants, or other computing devices. The scoring system 1100 may include a memory 1130, which may include a random access memory ("RAM") for temporary storage of information, a read only memory ("ROM") for permanent storage of information, and/or a mass storage device, such as a hard drive, diskette, optical media storage device, or USB flash drive. The scoring system 1100 may also contain a separate mass storage device 1120 for permanent storage of information. Typically, the modules of the scoring system are in communication with each other via a standards based bus system. In different embodiments, the standards based bus system could be Peripheral Component Interconnect (PCI), Microchannel, SCSI, Industrial Standard Architecture (ISA), and Extended ISA (EISA) architectures, for example.

The scoring system 1100 may be generally controlled and coordinated by operating system software, such as Windows 95, 98, NT, 2000, XP, Vista, 7, 8, SunOS, Solaris, Blackberry OS, or other compatible operating systems. In Macintosh systems, the operating system may be any available operating system, such as MAC OS X. In other embodiments, the Scoring system 1100 may be controlled by a proprietary operating system. Conventional operating systems control and schedule computer processes for execution, perform memory management, provide file systems, networking, and I/O services, and provide a user interface, such as a graphical user interface ("GUI"), among other functions.

The example scoring system 1100 shown in FIG. 1 includes one or more commonly available input/output (I/O) interfaces and devices 1110, such as a keyboard, mouse, touchpad, and printer. In one embodiment, the I/O interfaces and devices 1110 include one or more display devices, such as a monitor, that allow the visual presentation of data to a user. More particularly, a display device provides for the presentation of GUIs, application software data, and multimedia presentations, for example. The scoring system 1100 may also include one or more multimedia devices 1140, such as speakers, video cards, graphics accelerators, and microphones, for example. In one embodiment, the I/O interfaces and devices 1110 comprise devices that are in communication with modules of the scoring system 1100 via a network, such as the network 1160, or any local area network, including secured local area networks, or any combination thereof. In some embodiments, multimedia devices and I/O interfaces and devices 1110 may be part of computing devices 1170, which scoring system 1100 may interact with through network 1160.

Some embodiments of a scoring system 1100 may contain fewer or additional elements and modules than are present in the embodiment in FIG. 10.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A computing system for providing user comparison information to a user, the computing system comprising:
   a user computing device;
   one or more demographic databases each storing demographic attributes for each of a plurality of users;
   a server computing system comprising:
      one or more computer processors configured to execute first software instructions; and
      a non-transitory computer readable storage device configured to store the first software instructions executable by the one or more computer processors in order to cause the server computing system to:
         serve a website or mobile application content to the user computing device, the website or mobile application content comprising user interface controls usable by a user of the user computing device to:
            provide identification information of the user;
            provide identification information of a comparison individual; and
            perform a comparison of each of multiple demographic attributes of the user with the corresponding of the multiple demographic attributes of the comparison individual identified by the user;
   wherein the user computing device executes second software instructions to:
      render the website or mobile application content served by the server computing system;
      receive from the user and provide to the server computing system, via the rendered website or mobile application content, user identification information identifying the user of the user computing device;
      receive from the user and provide to the server computing system, via the rendered website or mobile application content, comparison individual identification information identifying the comparison individual; and receive from the user and provide to the server computing system, via the rendered website or mobile application content, a request to compare each of multiple demographic attributes of the user with corresponding of the multiple demographic attributes of the comparison individual identified by the user; and wherein the stored first software instructions executed by the server computing system further cause the server computing system to:

access demographic data from the one or more demographic databases regarding the user of the user computing device, based on the user identification information, the demographic data including one or more demographic attribute in each of three or more categories selected from: marital status, friends, profession, children, automobile, income level, residence, or education level;

receive, from the user, an indication of the comparison individual;

access comparison demographic data from the one or more demographic databases regarding the comparison individual, based on the comparison individual identification information, the comparison demographic data including one or more comparison demographic attribute in each of the three or more categories selected from: marital status, friends, profession, children, automobile, income level, residence, or education level;

access a data structure storing information regarding most favorable levels of respective demographic attributes, wherein for a first category of demographic attributes the data structure indicates that a higher number is more favorable and for a second category of demographic attributes the data structure indicates that a lower number is more favorable;

for each of the three or more categories:
  compare a value of the demographic attribute of the user with a value of the comparison demographic attribute of the comparison individual; and
  based on the information stored in the data structure regarding most favorable levels of demographic attributes associated with the category, determine which of either the user or the comparison individual has a most favorable demographic attribute for the category;

generate a comparison user interface indicating:
  each of the three or more categories,
  for each of the three or more categories:
    the one or more demographic attribute for the user;
    the one or more comparison demographic attribute for the comparison individual; and,
    a visual indication of which of the user or the comparison individual is associated with most favorable demographic attributes; and transmit the comparison user interface to the user computing device, wherein the user computing device is configured to render the comparison user interface for display to the user.

2. The computing system of claim 1, wherein the first software instructions further cause the server computing system to:

calculate a plurality of category scores for respective categories of the three or more categories based on the demographic attribute for the category; and calculate a plurality of comparison category scores for the respective categories of the three or more categories based on the comparison demographic attributes for the category.

3. The computing system of claim 2, wherein the first software instructions are further configured to cause the server computing system to:

receive one or more selections, from the user computing device, of categories to include in calculation of an overall rating and a comparison overall ratings; and adjust a model used to calculate the overall rating and the comparison overall rating to consider only the categories indicated by the user-provided one or more selections.

4. The computing system of claim 2, wherein the first software instructions are further configured to cause the server computing system to:

calculate an overall rating of the user based on the plurality of category scores; and calculate a comparison overall rating of the comparison individual based on the plurality of comparison category scores.

5. The computing system of claim 4, wherein the comparison user interface further comprises an indication of one or more actions that may be performed by the user to increase the overall rating of the user.

6. The computing system of claim 2, wherein the first software instructions further cause the server computing system to:

generate a second comparison user interface comprising a chart depicting changes of the overall rating of the user and/or changes of the comparison overall rating of the comparison individual over a time period; and transmit the second comparison user interface to the user computing device.

7. The computing system of claim 6, wherein the time period is one year.

8. The computing system of claim 1, wherein the first software instructions further cause the server computing system to:

calculate an overall rating of the user based on the demographic attributes for each of the three or more categories; and calculate an overall rating of the comparison individual based on the comparison demographic attributes for each of the three or more categories.

9. The computing system of claim 8, wherein said calculating the overall rating of the user is further based on a comparison of the demographic attributes of the user with the corresponding comparison demographic attributes of the comparison individual.

10. The computing system of claim 1, wherein a most favorable level for a particular demographic attribute indicates that the most favorable level is socially sought after.

11. The computing system of claim 1, wherein the first category is income level and the second category is quantity of children.

12. The computing system of claim 1, wherein the comparison individual resides within a same ZIP-9 area as the user.

13. The computing system of claim 1, wherein the first software instructions further cause the server computing system to:

determine that a first demographic attribute for the first category is either missing or incorrect;

communicate an update instruction to the user computing device causing the user computing device to update the comparison user interface to include a data input field in place of the first demographic attribute, wherein the data input field is configured to receive the first demographic attribute from the user.

14. The computing system of claim 1, wherein the comparison individual is a movie star that has played a leading role in one or more full length movies played at more than one hundred public movie theaters.

15. The computing system of claim 1, wherein the first software instructions further cause the server computing system to:

receive input from the user computing device regarding values of particular demographic attributes that are most favorable to the user, wherein the data structure is updated with the received input such that said comparison demographic data of the user and of the comparison individual is based on the updated information.

16. A server computing system for providing user comparison information to a user, the server computing system comprising:

one or more computer processors configured to execute first software instructions; and a non-transitory computer readable storage device configured to store the software instructions executable by the one or more computer processors in order to cause the server computing system to:

serve a website or mobile application content to a user computing device, the website or mobile application content comprising user interface elements configured to:

provide first identification information comprising first demographic attributes of the user;

provide second identification information comprising second demographic attributes of a group of comparison individuals, wherein the group of comparison individuals each having one or more demographic attributes in common with the user; and perform a comparison of the first demographic attributes with corresponding demographic attributes of the second demographic attributes;

render the website or mobile application content served by the server computing system;

receive, via the rendered website or mobile application content, the first identification information identifying the user of the user computing device and the second identification information identifying the group of comparison individuals;

provide to the server computing system the first identification information and the second identification information; and receive, via the rendered website or mobile application content, a request to compare the first demographic attributes of the first identification information with the corresponding second demographic attributes of the second identification information; and access demographic data of the user from a demographic database storing demographic attributes for a plurality of users, the demographic data including demographic attributes in three or more of the following categories: marital status, friends, profession, children, automobile, income level, residence, or education level;

access comparison demographic data of the group of comparison individuals from the demographic database, the comparison demographic data including comparison demographic attributes in three or more of the following categories: marital status, friends, profession, children, automobile, income level, residence, or education level;

access a data structure storing rules for ranking levels of respective demographic attributes, wherein for a first category of demographic attributes the data structure indicates that rankings in the first category increase as values of demographic attributes increase, and for a second category of demographic attributes the data structure indicates two or more possible values of demographic attributes in the second category and an indication of relative rankings of the two or more possible values with reference to one another;

for each of the three or more categories:

compare a value of the demographic attribute of the user with a value of the comparison demographic attribute of the group of comparison individuals; and based on the ranking information, determine which of either the user or the group of comparison individuals has a higher rank for the category;

generate a comparison user interface indicating:

each of the three or more categories, and for each of the three or more categories:

the first demographic attributes of the user in each of the categories and the second demographic attributes of the group of comparison individuals, and a visual indication of which of the user or the group of comparison individuals has a demographic attribute that is highest rated; and transmit the comparison user interface to the user computing device, wherein the user computing device is configured to render the comparison user interface for display to the user.

17. The server computing system of claim 16, wherein the user and each of the comparison individual of the group of comparison individuals reside in a common geographic area.

18. The server computing system of claim 17, wherein the first software instructions further cause the server computing system to:

calculate a plurality of category scores for respective categories based on the demographic attribute for the category; and calculate a plurality of comparison category scores for respective categories based on the comparison demographic attributes for the category;

wherein the comparison user interface includes at least some of the category scores and comparison category scores.

19. The server computing system of claim 18, wherein the first software instructions further cause the server computing system to:

receive a selection of the common geographic area from the user computing device; and update the category scores and the comparison category scores in response to a change in the common geographic area in the received selection.

20. The server computing system of claim 16, wherein the user and each of the comparison individual of the group of comparison individuals have at least following demographic attributes in common: an occupation, an employer, an income level, or an education level.

* * * * *